US009086742B2

(12) United States Patent
Tanaka et al.

(10) Patent No.: US 9,086,742 B2
(45) Date of Patent: Jul. 21, 2015

(54) THREE-DIMENSIONAL DISPLAY DEVICE, THREE-DIMENSIONAL IMAGE CAPTURING DEVICE, AND POINTING DETERMINATION METHOD

(71) Applicant: FUJIFILM Corporation, Tokyo (JP)

(72) Inventors: Koichi Tanaka, Saitama (JP); Junji Hayashi, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 233 days.

(21) Appl. No.: 13/725,839

(22) Filed: Dec. 21, 2012

(65) Prior Publication Data

US 2013/0106694 A1     May 2, 2013

Related U.S. Application Data

(63) Continuation of application No. PCT/JP2011/061399, filed on May 18, 2011.

(30) Foreign Application Priority Data

Jun. 29, 2010 (JP) ................................. 2010-147508
Mar. 25, 2011 (JP) ................................. 2011-068593

(51) Int. Cl.
G06F 3/041     (2006.01)
G06F 3/0346    (2013.01)
(Continued)

(52) U.S. Cl.
CPC .............. *G06F 3/0346* (2013.01); *G03B 35/18* (2013.01); *G06F 3/0418* (2013.01); *H04N 13/007* (2013.01); *H04N 13/0497* (2013.01)

(58) Field of Classification Search
CPC ..... G03B 35/18; G06F 3/0346; G06F 3/0418; H04N 13/0497; H04N 13/007

USPC .................................................. 345/173–179
See application file for complete search history.

(56) References Cited

U.S. PATENT DOCUMENTS

| | | | |
|---|---|---|---|
| 7,154,483 B2 * | 12/2006 | Kobayashi | ..................... 345/173 |
| 2006/0066589 A1 | 3/2006 | Ozawa et al. | |
| 2012/0320047 A1 * | 12/2012 | Yanagita et al. | ............... 345/419 |

FOREIGN PATENT DOCUMENTS

| | | |
|---|---|---|
| CN | 1755604 A | 4/2006 |
| JP | 8-087380 A | 4/1996 |

(Continued)

OTHER PUBLICATIONS

PCT/ISA/237 (written opinion of the international searching authority with English translation, dated Jan. 8, 2013).

(Continued)

*Primary Examiner* — Kevin Nguyen
*Assistant Examiner* — Cory Almeida
(74) *Attorney, Agent, or Firm* — McGinn IP Law Group, PLLC

(57) ABSTRACT

A three-dimensional display unit that displays a three-dimensional pointing image for receiving a user's pointing, the three-dimensional pointing image including a right-eye pointing image and a left-eye pointing image; a pointing position detection unit that detects the user's pointing position on the display surface of the three-dimensional display unit; a dominant-eye information setting unit that sets a piece of dominant-eye information representing a dominant-eye of the user; a pointing position detection area determination unit that determines a detection area of the pointing position on the display surface of the three-dimensional display unit based on at least the dominant-eye information; and a determination unit that determines whether the pointing position detected by the pointing position detection unit is within the detection area to receive the user's pointing corresponding to the three-dimensional pointing image.

25 Claims, 13 Drawing Sheets

(51) Int. Cl.
  *G03B 35/18* (2006.01)
  *H04N 13/00* (2006.01)
  *H04N 13/04* (2006.01)

(56) References Cited

FOREIGN PATENT DOCUMENTS

| | | | |
|---|---|---|---|
| JP | 2004-362218 A | | 12/2004 |
| JP | 2006-127486 A | | 5/2006 |
| JP | 2010-055266 A | | 3/2010 |
| WO | WO2010/023887 A1 | | 3/2010 |
| WO | WO 2011114567 A1 | * | 9/2011 |

OTHER PUBLICATIONS

PCT/IB/326 dated Jan. 28, 2013.
PCT/IB/338, dated Feb. 21, 2013.
PCT/IB/373, dated Jan. 8, 2013.
Notification of Reason(s) for Rejection dated Jan. 15, 2014, with English translation.
International Search Report in PCT/JP2011/061399 dated Jun. 28, 2011(English Translation Thereof).
Chinese Office Action dated Feb. 27, 2015 with English Translation.

* cited by examiner

THREE-DIMENSIONAL DISPLAY DEVICE, THREE-DIMENSIONAL IMAGE CAPTURING DEVICE, AND POINTING DETERMINATION METHOD

This application is a continuation application and claims the priority benefit under 35 U.S.C. §120 of PCT Application No. PCT/JP2011/061399 filed on May 18, 2011 which application designates the U.S., and also claims the priority benefit under 35 U.S.C. §119 of Japanese Patent Applications No. 2010-147508 filed on Jun. 29, 2010 and No. 2011-068593 filed on Mar. 25, 2011, which applications are all hereby incorporated in their entireties by reference.

TECHNICAL FIELD

The present invention relates to a three-dimensional display device, a three-dimensional image capturing device and a pointing determination method capable of appropriately determining a user's pointing position even when a pointing image for receiving the user's pointing is three-dimensionally displayed.

BACKGROUND ART

Conventionally, there is known a three-dimensional display device which simultaneously displays a three-dimensional image including a right-eye image and a left-eye image on a display screen, and which, when a user touches a touch panel disposed on the display screen with a finger or a touch pen, detects the pointing position on the touched display screen.

For example, PTL 1 discloses that the position of a control range for detecting a pointing position on a display screen is changed in the case when a pointing image is two-dimensionally displayed and in the case when the pointing image is three-dimensionally displayed. When three-dimensional display is made, the control range is set in a position where a stereoimage appears.

Also, PTL 2 discloses a configuration in which two-dimensional images for right-eye and a two-dimensional images for left-eye are created by subjecting a three-dimensional object to a right-eye projection processing and to a left-eye projection processing respectively, and are displayed on a three-dimensional display device, and in which, when selecting a point of action on the three-dimensional object using a cursor, the position of which is controlled by an operator, the point of action on the three-dimensional object is calculated based on the projection conditions which have been used for creating the two-dimensional image for a dominant-eye according to the dominant-eye of the operator. In particular, a line which connects a point on a projection plane corresponding to a cursor position to a projection center is extended toward the three-dimensional object; and an intersection point of the three-dimensional object and the line is determined as the point of action desired by the user.

CITATION LIST

Patent Literature

{PTL 1} Japanese Patent Application Laid-Open No. 2010-55266
{PTL 2} Japanese Patent Application Laid-Open No. 2004-362218

SUMMARY OF INVENTION

Technical Problem

As shown in FIG. 14, in a three-dimensional display device which displays a three-dimensional pointing image 53 including a right-eye pointing image 53R and a left-eye pointing image 53L, when a user performs an operation to point the three-dimensional pointing image 53 with a finger or a touch pen while viewing the three-dimensional pointing image 53, since the position where the three-dimensional pointing image 53 appears and a display position of the two-dimensional pointing images (the right-eye pointing image 53R and the left-eye pointing image 53L) as the source of the three-dimensional pointing image 53 do not coincide with each other, it is difficult to precisely detect the position where the user points.

The reason of this is as described below. That is, the three-dimensional pointing image appears at generally an intermediate position between the right-eye pointing image and the left-eye pointing image; and when the user intends to point the three-dimensional pointing image while viewing the three-dimensional pointing image, the pointing position depends on the dominant-eye of the viewer. For example, when the user has the dominant-eye at the right-side, there is a tendency that a position, where is closer to the right-eye pointing image position than the intermediate position between the right-eye pointing image and the left-eye pointing image, is pointed.

In the configuration described in PTL 1, the detection area of the pointing position is set at the intermediate position. However, due to the dominant-eye of the user, the user does not always point the intermediate position between the right-eye pointing image and the left-eye pointing image. Therefore, there is a possibility that the user's pointing may not be correctly determined.

In the configuration described in PTL 2, the conditions to project the three-dimensional object to a two-dimensional plane are indispensable. Therefore, the point of action cannot be calculated on a three-dimensional image which has been created without using such projection conditions.

The present invention has been proposed in view of the above circumstances. An object of the present invention is to provide a three-dimensional display device, a three-dimensional image capturing device and a pointing determination method capable of appropriately determining the user's pointing position even when the pointing image for receiving user's pointing is three-dimensionally displayed.

Solution to Problem

To achieve the object, the present invention provides a three-dimensional display device which includes: a three-dimensional display unit that displays a three-dimensional pointing image for receiving a user's pointing, the three-dimensional pointing image including a right-eye pointing image and a left-eye pointing image; a pointing position detection unit that detects the user's pointing position on a display surface of the three-dimensional display unit; a dominant-eye information obtaining unit that obtains a piece of dominant-eye information representing a dominant-eye of the user; a detection area determination unit that determines a detection area of the pointing position on the display surface of the three-dimensional display unit based on at least the dominant-eye information; and a determination unit that determines whether the pointing position detected by the pointing position detection unit is within the detection area to thereby receive the user's pointing corresponding to the three-dimensional pointing image.

That is, since the detection range of the pointing position on the display surface of the three-dimensional pointing image is flexibly changes in accordance with the dominant-eye of the user, even when the three-dimensional pointing image having a stereoscopic effect is displayed, the user's pointing position can be appropriately determined.

In the description, the "three-dimensional pointing image" is an image for pointing operation with a pointing member such as a finger or a touch pen, which is stereoscopically viewably displayed (three-dimensionally displayed). As particular examples of the "three-dimensional pointing image", a so-called button type 3D image (for example, a 3D button, a 3D icon, a 3D thumbnail), so-called slide type 3D image (for example, 3D slide bar) and the like are available. The manner of touch operation (button operation, slide operation, etc.) and the expression mode of the three-dimensional pointing image (kind of shape, graphic/symbol/pattern, etc.) are not particularly limited.

According to an embodiment of the present invention, the detection area determination unit changes at least one of the position, the size and the shape of the detection area in accordance with the existence or absence of the dominant-eye information.

According to an embodiment of the present invention, when the dominant-eye information exists, the detection area determination unit causes the size of the detection area to be smaller than the size of the detection area in the case of the absence of the dominant-eye information. That is, since the size of the detection area of the pointing position is set to be smaller by obtaining the dominant-eye information, erroneous detection of the pointing position is prevented and a plurality of three-dimensional pointing images can be disposed densely.

According to an embodiment of the present invention, when the dominant-eye information exists, the detection area determination unit changes at least one of the position, the size and the shape of the detection area depending on the user's dominant-eye at the right side or left side.

According to an embodiment of the present invention, when the dominant-eye information exists, the detection area determination unit disposes the detection area closer to the display position of a pointing image of the dominant-eye in the right-eye pointing image and the left-eye pointing image. That is, since the detection area of the pointing position is disposed closer to the display position of the pointing image of the dominant-eye by obtaining the dominant-eye information, the pointing position can be precisely detected.

According to an embodiment of the present invention, when the dominant-eye information exists, the detection area determination unit determines the detection area so that at least a part of the pointing image corresponding to the dominant-eye in the right-eye pointing image and the left-eye pointing image is included.

According to an embodiment of the present invention, when the dominant-eye information is absent, the detection area determination unit determines the detection area so that at least a part of the right-eye pointing image and at least a part of the left-eye pointing image are included. That is, even when the dominant-eye is not clear, the user's pointing position can be correctly determined.

According to an embodiment of the present invention, the dominant-eye information obtaining unit calculates the dominant-eye information which represents the dominant-eye of the user and the strength level of the dominant-eye based on the user's pointing position detected by the pointing position detection unit in a state that the three-dimensional pointing image is displayed on the three-dimensional display unit and a parallax amount of the three-dimensional pointing image.

That is, since the dominant-eye of the user and the strength level of the dominant-eye are measured during user's actual pointing operation, and the detection area of the pointing position is determined based on the measured result, the user's pointing position can be precisely determined.

According to an embodiment of the present invention, the dominant-eye information is calculated by displaying the three-dimensional pointing image several times on the three-dimensional display unit while varying the parallax amount to detect the user's pointing position several times with the pointing position detection unit.

According to an embodiment of the present invention, the dominant-eye information is calculated by displaying the three-dimensional pointing image several times on the three-dimensional display unit while varying the display position to detect the user's pointing position several times with the pointing position detection unit.

According to an embodiment of the present invention, the dominant-eye information is calculated by displaying several three-dimensional pointing images on the three-dimensional display unit while varying the display position to detect the user's pointing position several times with the pointing position detection unit.

According to an embodiment of the present invention, the dominant-eye information obtaining unit receives an input operation of the information on the dominant-eye of the user.

According to an embodiment of the present invention, a stereoscopic effect setting unit that receives a setting input operation of the magnitude of the stereoscopic effect of the three-dimensional pointing image; and a three-dimensional pointing image generation unit that generates the three-dimensional pointing image with the parallax amount corresponding to the magnitude of the set and input stereoscopic effect are further included, wherein the three-dimensional display unit displays a three-dimensional display image generated by the three-dimensional pointing image generation unit, and the detection area determination unit determines the detection area based on the parallax amount corresponding to the magnitude of the stereoscopic effect.

That is, the stereoscopic effect sensed by the user varies among different individuals, but by receiving setting input operation of the magnitude of the stereoscopic effect of a three-dimensional pointing image, the three-dimensional pointing image is displayed with the parallax amount corresponding to the stereoscopic effect, and the detection area of the pointing position is determined based on the parallax amount corresponding to the magnitude of the stereoscopic effect. Therefore, user's pointing position can be appropriately determined while satisfying the user with the stereoscopic effect.

According to an embodiment of the present invention, a user change detection unit is included, which detects a change of the user who has input the pointing through the pointing position detection unit.

According to an embodiment of the present invention, the user change detection unit calculates the number of times or frequency when the pointing position detected by the pointing position detection unit is out of the range of a detection area determined by the detection area determination unit to detect a change of the user based on the calculation result.

According to an embodiment of the present invention, the user change detection unit creates a piece of history information on the pointing position detected by the pointing position detection unit and detects a change of the user based on the history information on the pointing position.

According to an embodiment of the present invention, the user change detection unit detects a change of the user by detecting a change of the dominant-eye or the strength level of the dominant-eye based on the history information on the pointing position.

According to an embodiment of the present invention, a control unit is included, which executes at least any one of: calibration processing in which, when a change of the user has been detected by the user change detection unit, the dominant-eye information of a new user is obtained and at least one difference in the position, the size and the shape of the detection area with respect to the display area of the left-eye pointing image and the right-eye pointing image is determined; detection mode switching processing to switch the mode from a first detection mode in which the detection area is determined based on the dominant-eye information to a second detection mode in which the detection area is set to a default having a larger size than the default at the time of the first detection mode; display mode switching processing to switch the mode from a first display mode in which the three-dimensional pointing image is displayed, to a second display mode in which a plane pointing image is displayed; and alarm processing to output an alarm.

According to an embodiment of the present invention, a selection reception unit is included, which, when a change of the user has been detected, receives from the user a selection of a process to be executed.

Also, the present invention provides a three-dimensional image capturing device, which includes: the three-dimensional display device; and a three-dimensional imaging unit that obtains a three-dimensional image by taking an image of an object from multiple view points, wherein the three-dimensional image capturing device synthesizes the three-dimensional image and the three-dimensional pointing image with each other to three-dimensionally display the synthesized image by the three-dimensional display unit.

Also, the present invention provides a pointing determination method using a three-dimensional display unit that displays a three-dimensional pointing image for receiving a user's pointing, the three-dimensional pointing image including a right-eye pointing image and a left-eye pointing image; a pointing position detection unit that detects the user's pointing position on a display surface of the three-dimensional display unit; and a dominant-eye information obtaining unit that obtains a piece of dominant-eye information representing a dominant-eye of the user, wherein the pointing determination method includes: a detection area determination step to determine a detection area of the pointing position on the display surface of the three-dimensional display unit based on the dominant-eye information obtained by the dominant-eye information obtaining unit; a pointing position detection step to detect the user's pointing position on the surface of the three-dimensional display unit with the pointing position detection unit; and a determination step to determine whether the pointing position detected by the pointing position detection unit is within the detection area.

According to an embodiment of the present invention, a step to calculate the dominant-eye information representing the dominant-eye of the user and the strength level of the dominant-eye based on the user's pointing position which has been detected by the pointing position detection unit in a state that the three-dimensional pointing image is displayed on the three-dimensional display unit and based on the parallax amount of the three-dimensional pointing image is included.

According to an embodiment of the present invention, a step to receive an input operation of the dominant-eye information of the user is included.

According to an embodiment of the present invention, the pointing determination method performs at least any one of: calibration processing in which a change of the user who has input the pointing through the pointing position detection unit is detected, and, when a change of the user has been detected, the dominant-eye information of a new user is obtained and at least one difference in the position, the size and the shape of the detection area with respect to the display area of the left-eye pointing image and the right-eye pointing image is determined; detection mode switching processing to switch the mode from a first detection mode in which the detection area is determined based on the dominant-eye information to a second detection mode in which the detection area is set to a default having a larger size than the default at the time of the first detection mode; display mode switching processing to switch the mode from a first display mode in which the three-dimensional pointing image is displayed, to a second display mode in which a plane pointing image is displayed; and alarm processing to output an alarm.

Also, the present invention provides a program causing a computer to execute the pointing determination method. The program can be recorded in a predetermined recording medium, and can be provided and used as a program recording medium.

Advantageous Effects of Invention

According to the present invention, the user's pointing position can be appropriately determined even when the pointing image for receiving the user's pointing is three-dimensionally displayed.

DESCRIPTION OF EMBODIMENTS

Embodiments of the present invention will be described in detail below referring to the appended drawings.

First Embodiment

Figure 1:
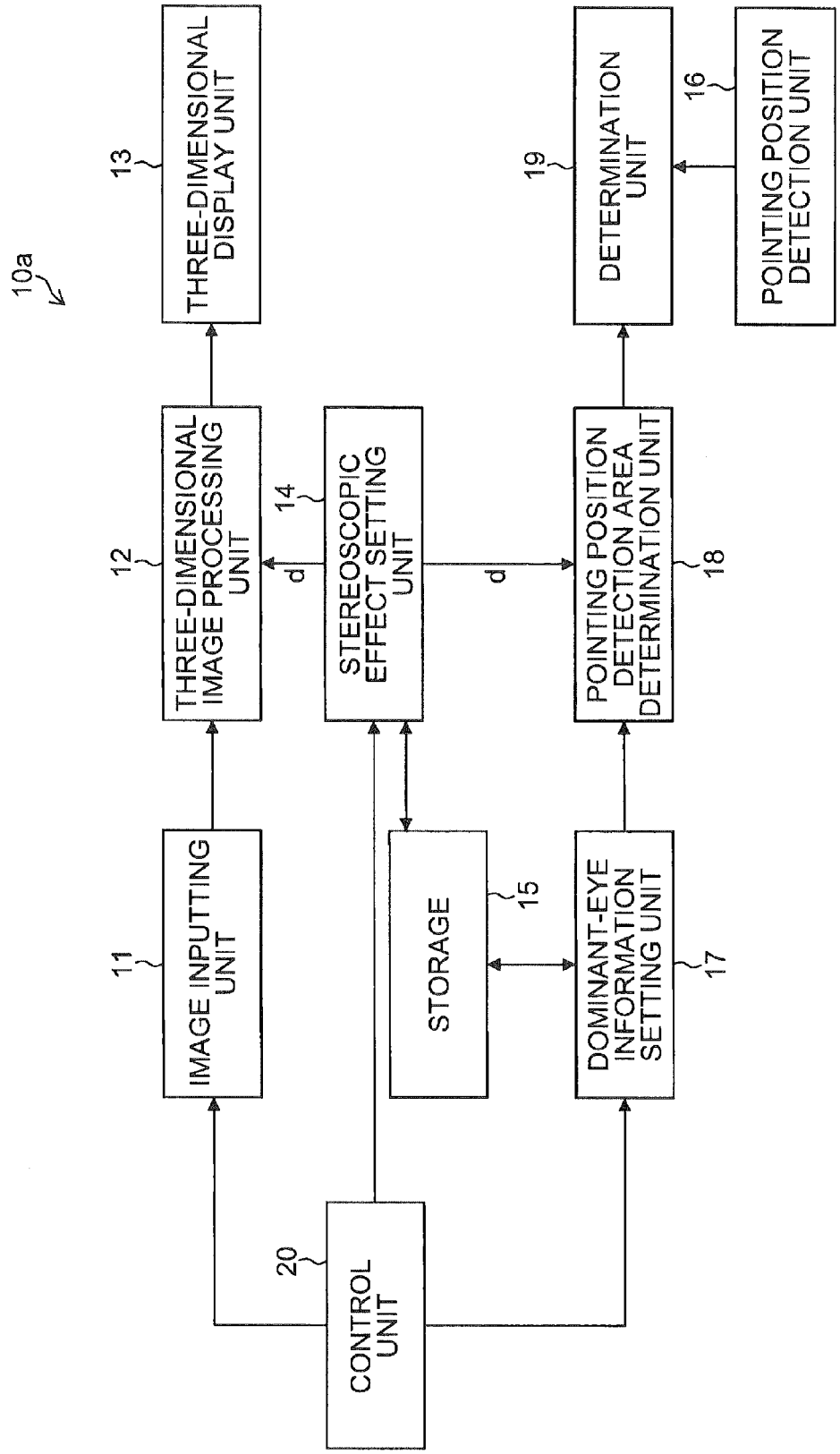
FIG. 1 is a block diagram showing an example of a configuration of a three-dimensional display device according to a first embodiment.

FIG. 1 is a block diagram showing an example of a configuration of a three-dimensional display device 10 according to a first embodiment.

An image inputting unit 11 inputs a monocular 2D image. A three-dimensional image processing unit 12 converts the monocular 2D image output from the image inputting unit 11 into a 3D image which includes multiple-view 2D images (a right-eye image and a left-eye image). A three-dimensional display unit 13 three-dimensionally displays the 3D image.

In this description, "2D" means a two-dimension (plane), and "3D" means a three-dimension (stereoscopic). That is, a "2D image" is a planar image; and a "3D image" is a three-dimensional image (stereoscopically viewable image).

In FIGS. 2(A) to 2(C), each illustrates a situation in which a 3D pointing image is displayed on the three-dimensional display unit 13 for receiving a pointing made by a user, the 3D pointing image including multiple-view 2D pointing images (a right-eye pointing image 53R and a left-eye pointing image 53L). FIG. 2(A) illustrates an example of the right-eye pointing image 53R, the left-eye pointing image 53L and a pointing position detection area 56 in the case when a parallax amount is zero (no protrusion of a stereoimage). FIG. 2(B) illustrates an example of the right-eye pointing image 53R, the left-eye pointing image 53L and the pointing position detection area 56 when the parallax amount is small (protrusion amount of the stereoimage is small). FIG. 2(C) illustrates an example of the right-eye pointing image 53R, the left-eye pointing image 53L and the pointing position detection area 56 when the parallax amount is large (protrusion amount of the stereoimage is large).

A stereoscopic effect setting unit 14 receives a setting input operation concerning the magnitude (strength level) of the stereoscopic effect on the 3D pointing image and stores, in a storage 15, a parallax amount corresponding to the magnitude of the set and input stereoscopic effect. Also, the stereoscopic effect setting unit 14 provides the parallax amount stored in the storage 15 to the three-dimensional image processing unit 12 and a pointing position detection area determination unit 18 which will be described later.

For example, the stereoscopic effect setting unit 14 displays a selection menu of the stereoscopic effect: "strong", "medium" and "soft" on the three-dimensional display unit 13 to receive a selection input of the stereoscopic effect level from a user, and stores the parallax amount d corresponding to the stereoscopic effect level in the storage 15. Since the stereoscopic effect sensed by the user varies among different individuals, such configuration that provides adjustable stereoscopic effect is meaningful.

A pointing position detection unit 16 is disposed on the display surface of the three-dimensional display unit 13, and detects a user's pointing position on the display surface of the three-dimensional display unit 13 pointed by the user with a finger or a touch pen.

A dominant-eye information setting unit 17 receives a setting and input of a piece of dominant-eye information of the user and stores the set and input dominant-eye information in the storage 15. That is, the dominant-eye information setting unit 17 obtains the piece of dominant-eye information by receiving the input operation by the user. For example, an inquiry is made to the user about the dominant-eye (right/left) on the display (or voice output), and receives a selection input (right/left) from the user. In the embodiment, a description is made on the configuration in which the dominant-eye information is obtained through the setting input operation. A description on a mode in which the dominant-eye information is obtained by automatically determining the dominant-eye of the user will be made in a third embodiment below.

The pointing position detection area determination unit 18 determines a pointing position detection area on the display surface of the three-dimensional display unit 13 based on the parallax amount in the dominant-eye information and 3D pointing image. For example, when the dominant-eye information has been obtained, at least one of the position, the size and the shape on the display surface in the pointing position detection area is changed depending on the dominant-eye of the user (right eye/left eye).

A determination unit 19 determines whether the pointing position detected by the pointing position detection unit 16 is within a range of a pointing position detection area determined by the pointing position detection area determination unit 18 and receives the user's pointing corresponding to the 3D pointing image. That is, the determination unit 19 determines whether the user's pointing corresponding to the 3D pointing image is present or absent.

A control unit 20 controls the units included in the three-dimensional display device 10 such as the image inputting unit 11 and the stereoscopic effect setting unit 14.

The image inputting unit 11, the three-dimensional image processing unit 12, the pointing position detection area determination unit 18, the determination unit 19 and the control unit 20 shown in FIG. 1 are configured, for example, by a microprocessor. The pointing position detection unit 16 is configured by, for example, a touch sensor. The stereoscopic effect setting unit 14 is configured by, for example, a touch sensor and a microprocessor. The dominant-eye information setting unit 17 is configured by, for example, a touch sensor and a microprocessor. The stereoscopic effect setting unit 14 and the dominant-eye information setting unit 17 may be configured by including other input devices such as keys and a mouse in place of the touch sensor. The storage 15 is configured by, for example, a memory. The processing on the respective units may be executed by software in accordance with a program or through hardware via a circuit.

Figure 3:
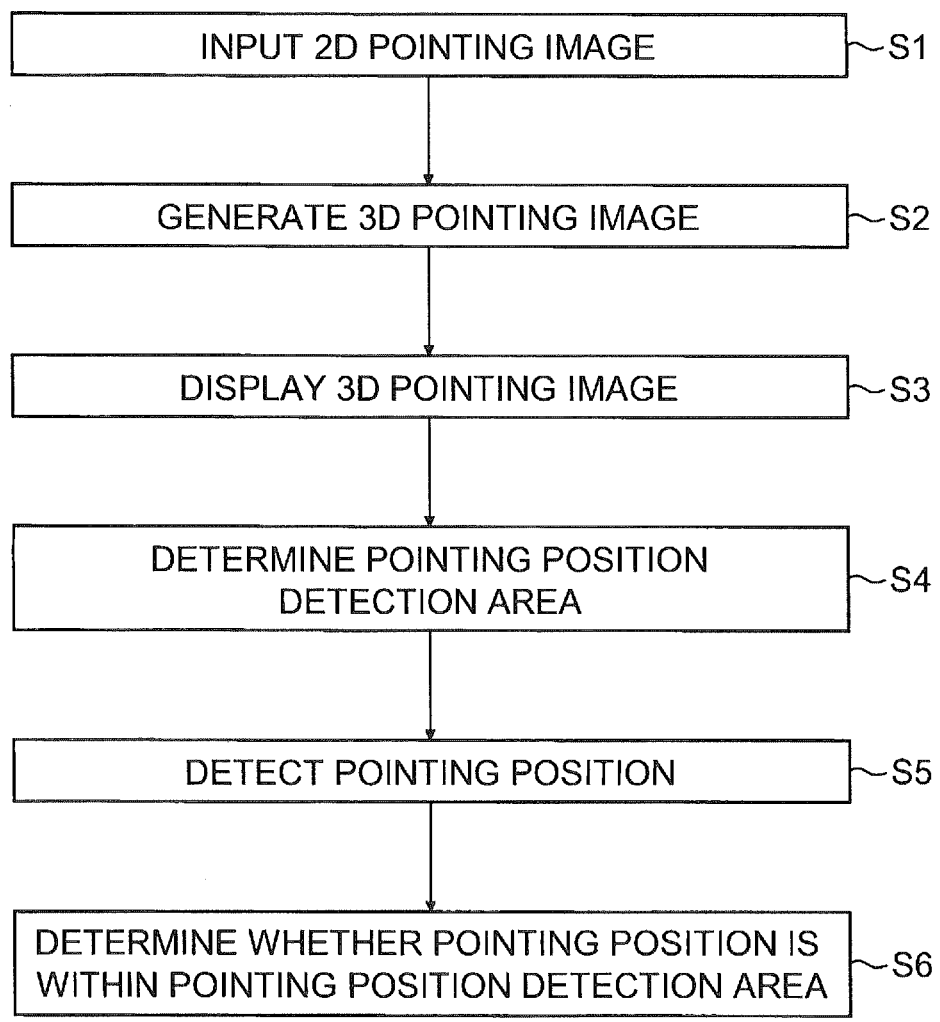
FIG. 3 is a flowchart showing a basic flow of a pointing determination processing.

FIG. 3 is a flowchart showing a basic flow of a pointing determination processing using the 3D pointing image. The processing is executed through the control by the control unit 20 in accordance with a program.

First of all, the image inputting unit 11 inputs a monocular 2D pointing image (step S1), and the stereoscopic effect setting unit 14 provides a parallax amount d to the three-dimensional image processing unit 12. The three-dimensional image processing unit 12 generates a 3D pointing image including the parallax amount d using the monocular 2D pointing image (step S2). The generated 3D pointing image is three-dimensionally displayed by the three-dimensional display unit 13 (step S3). Also, the dominant-eye information setting unit 17 provides the dominant-eye information to the pointing position detection area determination unit 18, and the stereoscopic effect setting unit 14 provides the parallax amount d to the pointing position detection area determination unit 18. The pointing position detection area determination unit 18 determines the pointing position detection area based on the dominant-eye information and the parallax amount d (step S4). When the pointing position detection unit 16 detects the user's pointing position (step S5), the determination unit 19 determines whether the user's pointing position is within the pointing position detection area (step S6). The determination of the pointing position detection area (step S4) in FIG. 3 may be made before the display (step S3).

For example, as shown in FIG. 2(B) and FIG. 2(C), the right-eye pointing image 53R and the left-eye pointing image 53L are displayed on the three-dimensional display unit 13 at the position displaced from each other by the parallax amount d in an x-direction (horizontal direction), thereby the 3D pointing image is three-dimensionally displayed. That is, the user recognizes the 3D pointing image of a "P" button including the right-eye pointing image 53R and the left-eye pointing image 53L as a stereoimage, which protrudes forward in the Figure.

When the display shown in FIG. 2(B) and FIG. 2(C) is made, a stereoimage appears in an area between the center position of the right-eye pointing image 53R and the center position of the left-eye pointing image 53L. When the user points the stereoimage on the display surface of the three-dimensional display unit 13 with a finger, a touch pen or the like while viewing the stereoimage, the pointing position is a position which depends on the dominant-eye of the user.

A description is made particularly on the case when the user has the dominant-eye at the right side. In the case that the user has the dominant-eye at the right side, there is a tendency that the user points a position closer to the center position of the right-eye pointing image 53R than an intermediate position C between the center position of the right-eye pointing image 53R and the center position of the left-eye pointing image 53L. According to the embodiment, a pointing position detection area, which includes the display area of the right-eye pointing image 53R and the intermediate position C, is set.

Figure 2:
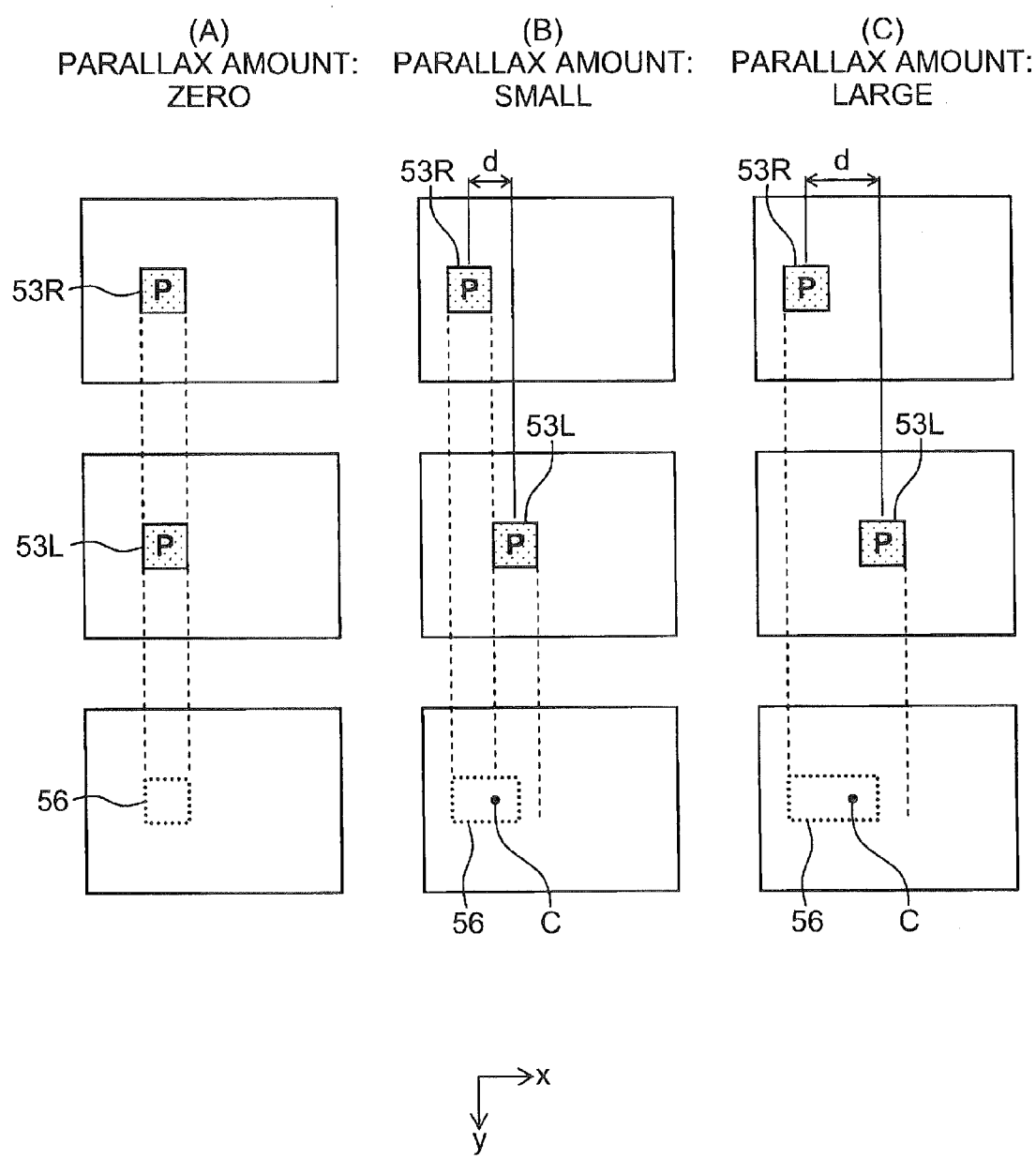
FIG. 2 is an illustration showing an example of a right-eye pointing image, a left-eye pointing image, and a pointing position detection area, when dominant-eye information has already been obtained.

For example, defining the size of the P buttons of the right-eye pointing image 53R and the left-eye pointing image 53L shown in FIG. 2 as N×N dots; the center position of the right-eye pointing image 53R as (x1, y1); and the parallax amount as d, the center position of the left-eye pointing image is represented as (x2, y2)=(x1+d, y1). The upper-left coordinates (x_area1, y_area1) and the lower-right coordinates (x_area2, y_area2) of the pointing position detection area 56 are represented by the following formula.

When d is plus, $$x\_area1 = x1 - N/2$$

$$y\_area1 = y1 - N/2$$

$$x\_area2 = x1 + (d+N)/2$$

$$y\_area2 = y1 + N/2$$

When d is minus, $$x\_area1 = x1 + (d-N)/2$$

$$y\_area1 = y1 - N/2$$

$$x\_area2 = x1 + N/2$$

$$y\_area2 = y1 + N/2 \quad \text{[Formula 1]}$$

wherein, the upper-left of the display surface of the three-dimensional display unit is defined as (0, 0); the horizontal direction is defined as x-axis; and the vertical direction is defined as y-axis. Also, the horizontal right direction is defined as the plus direction of the x-axis; and the vertical down direction is defined as the plus direction of the y-axis. Formula 1 is just an example.

As demonstrated above, when the dominant-eye information has been obtained, the pointing position detection area determination unit 18 disposes the pointing position detection area to a position closer to the display position of the pointing image of the dominant-eye in the right-eye pointing image and the left-eye pointing image.

The pointing position detection area determination unit 18 changes the range of the pointing position detection area 56 in accordance with the dominant-eye information and the parallax amount d, to thereby appropriately detect the user's pointing in accordance with the dominant-eye of the user and the strength level of the stereoscopic effect of the 3D pointing image. Here, the strength level of the stereoscopic effect is proportional to a displacement amount (parallax amount d) between the right-eye pointing image 53R and the left-eye pointing image 53L in the horizontal direction x. FIG. 2(A) illustrates the pointing position detection area 56 when the parallax amount is set to zero; FIG. 2(B) illustrates the pointing position detection area 56 when the parallax amount is set to small; and FIG. 2(C) illustrates the pointing position detection area 56 when the parallax amount is set to large.

When the dominant-eye information has been obtained (exists), the pointing position detection area determination unit 18 according to the embodiment changes at least one of the position, the size and the shape of the pointing position detection area depending on the right side or the left side of the dominant-eye of the user. For example, when the dominant-eye information has been obtained (exists), the pointing position detection area is disposed at an area closer to the dominant eye.

Using FIG. 2, an example is given, in which the pointing position detection area is determined so that the entire of the 2D pointing image corresponding to the dominant-eye (for example, the right-eye pointing image 53R) is included. However, the pointing position detection area may be determined so that at least a part of the 2D pointing image corresponding to the dominant-eye is included.

When the pointing position detection area is set at an intermediate position between the left-eye pointing image and the right-eye pointing image as conventional manner, since the user not always points the intermediate position using a finger or the like depending on the dominant-eye of the user, there's a possibility that a pointing position where the user intends to point may not be determined correctly. Contrarily, according to the embodiment, the pointing position detection area on the display surface of the three-dimensional display unit 13 is variably determined in accordance with the information on the dominant-eye of the user and the parallax amount. Accordingly, the user's intended pointing is correctly determined.

Second Embodiment

Then, a description on a second embodiment is made below. In the following description, items which are different from those in the first embodiment will be described, and as for the items which have been described in the first embodiment, the description thereof is omitted here.

When the dominant-eye of the user is not unclear, it is necessary to determine the pointing position detection area accordingly. In the conventional manner in which the user's pointing is detected at an intermediate position between the left-eye pointing image position and the right-eye pointing image position, it is difficult to cover the entire area where there is a possibility to be pointed. The reason of this is as described below. That is, there is a tendency that a user, who has the dominant-eye at the right side, points an area closer to the right-eye pointing image; while a user, who has the dominant-eye at the left side, points an area closer to the left-eye pointing image.

The pointing position detection area determination unit 18 according to this embodiment determines the pointing position detection area 56, so that, when the dominant-eye information has not been obtained (absent), at least a part of the right-eye pointing image 53R and at least a part of left-eye pointing image 53L are included as shown in FIG. 4(A) and FIG. 4(B). FIG. 4(A) illustrates an example of the right-eye pointing image 53R, the left-eye pointing image 53L and the pointing position detection area when the parallax amount is small (protrusion amount of stereoimage is small). FIG. 4(B) illustrates an example of the right-eye pointing image 53R, the left-eye pointing image 53L and the pointing position detection area when the parallax amount is large (protrusion amount of stereoimage is large).

Referring to FIG. 4(A) and FIG. 4(B), defining the size of the 2D pointing image (the right-eye pointing image 53R and the left-eye pointing image 53L) as N×N, the center position of the right-eye pointing image 53R as (x1, y1); the center position of the left-eye pointing image 53L as (x1+d; y1); and d as the parallax amount of the 3D pointing image, the range of the pointing position detection area 56 is calculated as shown below.

When $d$ is plus:

$$x\_area1 = x1 - N/2$$

$$y\_area1 = y1 - N/2$$

$$x\_area2 = x1 + d + N/2$$

$$y\_area2 = y1 + N/2$$

When $d$ is minus:

$$x\_area1 = x1 + d - N/2$$

$$y\_area1 = y1 - N/2$$

$$x\_area2 = x1 + N/2$$

$$y\_area2 = y1 + N/2$$ [Formula 2]

Figure 5:
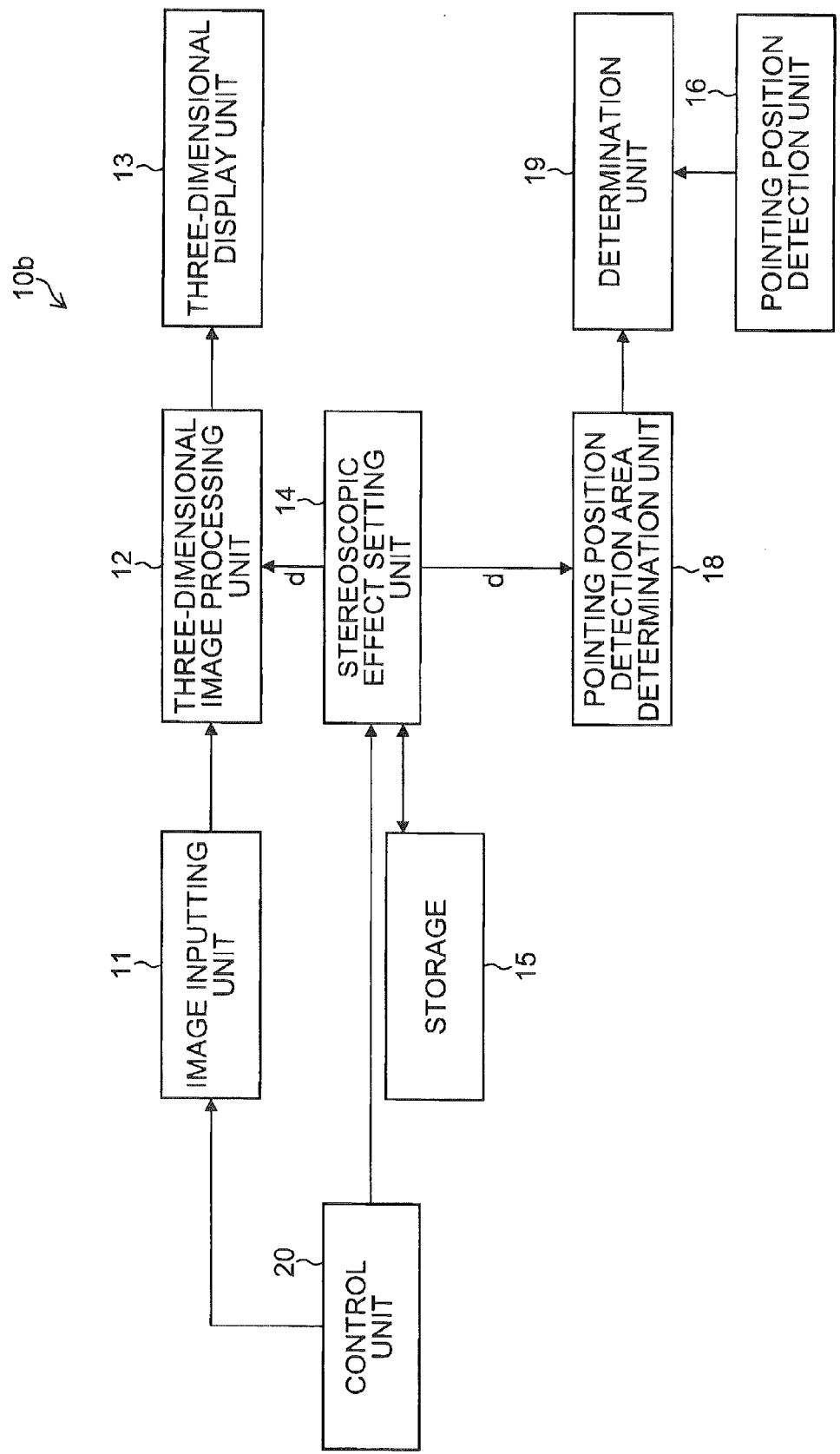
FIG. 5 is a block diagram showing an example of a configuration of a three-dimensional display device according to a second embodiment.

The wording, when the dominant-eye of the user is unclear, means, first, as shown in FIG. 5, there is the case where the dominant-eye information setting unit 17 is omitted from the configuration shown in FIG. 1; and secondly, there is the case where, in the configuration shown in FIG. 1, the information on the dominant-eye of the user has not been set by the dominant-eye information setting unit 17.

Figure 6:
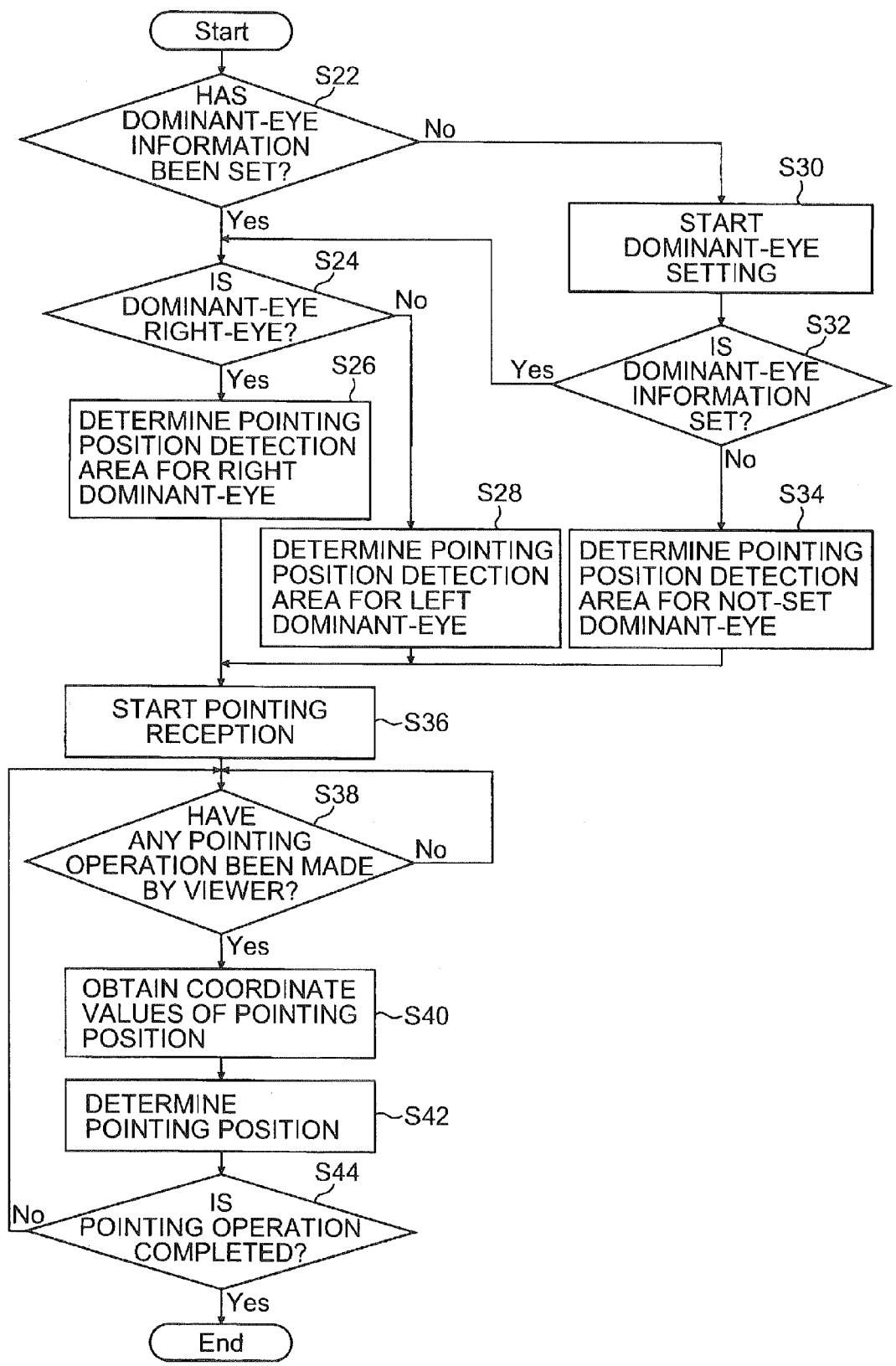
FIG. 6 is a flowchart showing an example of flow of the pointing determination processing according to the second embodiment.

FIG. 6 is a flowchart showing an example of a flow of the pointing determination processing using the 3D pointing image when it is set as arbitrary; i.e. whether the information on the dominant-eye of the user is set or not, by the dominant-eye information setting unit 17 in the configuration shown in FIG. 1. This processing is executed in accordance with a program under the control by the control unit 20.

In step S22, it is determined if the dominant-eye information has already been set. That is, it is determined whether the information on the dominant-eye of the user is stored or not (exist/absence) in the storage 15. When yes, the process proceeds to step S24; and when not, the process proceeds to step S30.

In step S24, it is determined whether the dominant-eye of the user is the right-eye based on the dominant-eye information. When the dominant-eye is right-eye, the pointing position detection area determination unit 18 determines the pointing position detection area for right dominant-eye and sets the same to the determination unit 19 in step S26. When the dominant-eye is left-eye, the pointing position detection area determination unit 18 determines the pointing position detection area for the left dominant-eye and sets the same to the determination unit 19 in step S28.

When the dominant-eye information has not been set, the dominant-eye information setting unit 17 starts the dominant-eye setting in step S30. For example, an inquiry is issued to the user asking which of the right and left eyes is the dominant-eye on the display (or via voice output), and receives selection input of right/left from the user.

Figure 4:
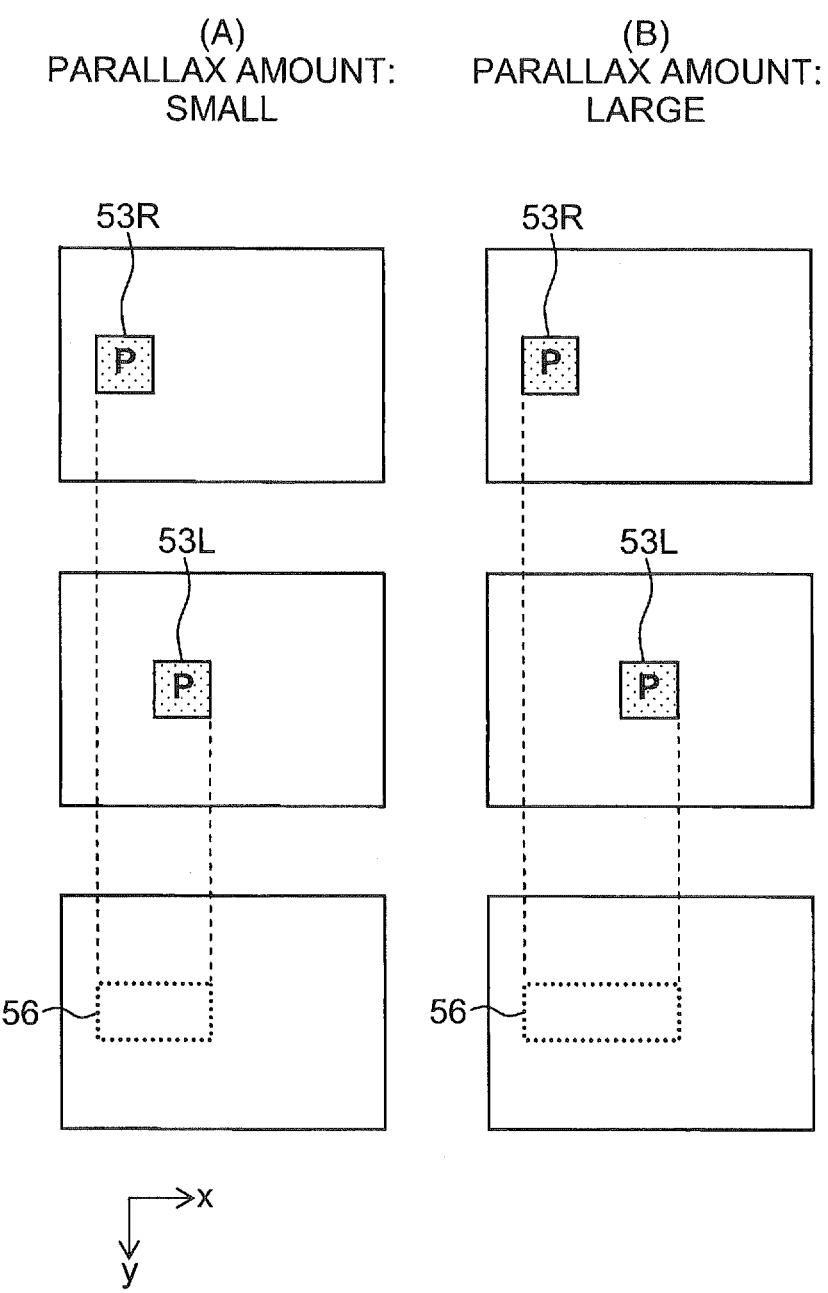
FIG. 4 is an illustration showing an example of the right-eye pointing image, the left-eye pointing image, and the pointing position detection area, when the dominant-eye information is not yet obtained.

In step S32, it is determined whether the dominant-eye information has been set or not. When yes, the process proceeds to step S24. When not, the pointing position detection area determination unit 18 determines the pointing position detection area 56 for not-set dominant-eye as shown in FIG. 4, and sets the same to the determination unit 19 in step S34.

In step S36, reception of the user's pointing starts.

In step S38, it is determined whether any user's pointing operation has been made to the pointing position detection unit 16 (that is, whether the pointing position detection unit 16 has detected the pointing position). When yes, the processing proceeds to step S40; when not, the determination in step S38 is repeated.

In step S40, the pointing position (coordinate values) is obtained from the pointing position detection unit 16.

In step S42, the determination unit 19 determines whether the detected pointing position is within the pointing position detection area.

In step S44, it is determined whether the pointing operation is continued or completed. When continued, the processing returns to step S38; when completed, the processing is terminated.

The pointing position detection area determination unit 18 according to this embodiment, the dominant-eye information setting unit 17 changes at least one of the position, the size and the shape of the pointing position detection area in accordance with the existence or absence of the dominant-eye information. With this, different from the conventional manner in which the user's pointing is detected only at the intermediate position between the left-eye pointing image position and the right-eye pointing image position, an area where there is a possibility to be pointed by the user can be adequately covered even when the dominant-eye of the user is unclear. Accordingly, the determination accuracy of the user's pointing can be increased. For example, when the dominant-eye information has been set (exist), the size of the pointing position detection area is set to be smaller than that when the dominant-eye information has not been set (absent). The shape of the pointing position detection area may be varied between the case when the dominant-eye information has been set and the case when the dominant-eye information has not been set.

Third Embodiment

Figure 7:
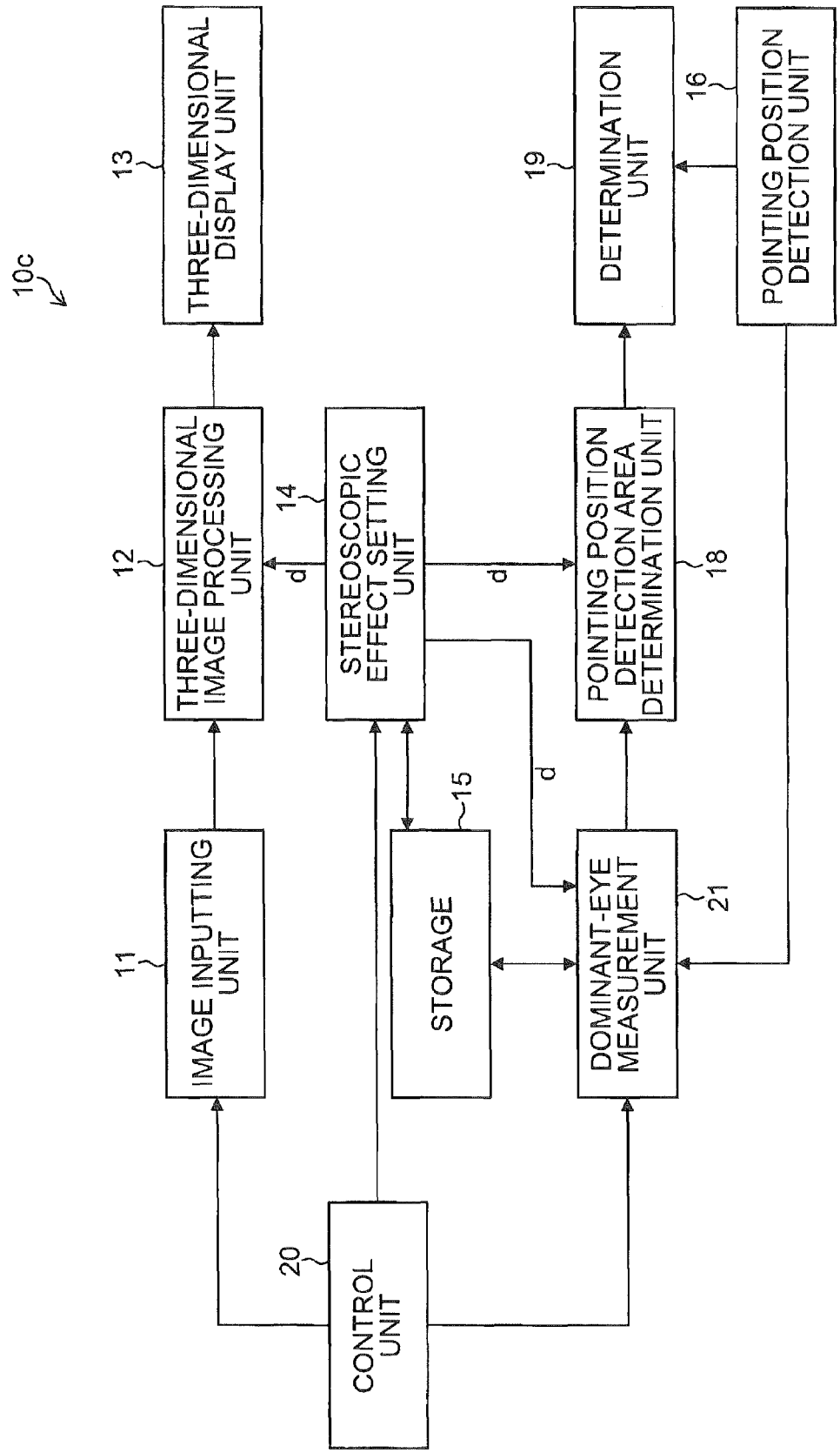
FIG. 7 is a block diagram showing an example of a configuration of a three-dimensional display device according to a third embodiment.

Then, a third embodiment will be described. FIG. 7 is a block diagram showing an example of a configuration of a three-dimensional display device 10c according to the third embodiment. The elements which are shown in FIG. 1 are given with the same reference numerals and characters, and as for the items which have been described above, the description thereof is omitted.

The three-dimensional display device 10c according to this embodiment includes a dominant-eye measurement unit 21 as a dominant-eye information obtaining unit. The dominant-eye measurement unit 21 performs a dominant-eye measurement, and provides a piece of dominant-eye information as the measured result to the pointing position detection area determination unit 18. The control unit 20 according to this embodiment controls the respective units including the dominant-eye measurement unit 21.

The dominant-eye measurement unit 21 calculates a dominant-eye parameter based on the parallax amount of the 3D pointing image including the right-eye pointing image 53R and the left-eye pointing image 53L and a user's pointing position which is detected by the pointing position detection unit 16 in a state that the 3D pointing image is displayed on the three-dimensional display unit 13.

The dominant-eye parameter is the dominant-eye information in this embodiment, which represents the dominant-eye of the user and a degree of the dominant-eye (referred to as "level of the dominant-eye"). The level of the dominant-eye represents of a level that the user's pointing position on the display surface of the three-dimensional display unit 13 displaces toward the display position of the pointing image at the dominant-eye in the display position of the right-eye pointing image 53R and the display position of the left-eye pointing image 53L.

Figure 8:
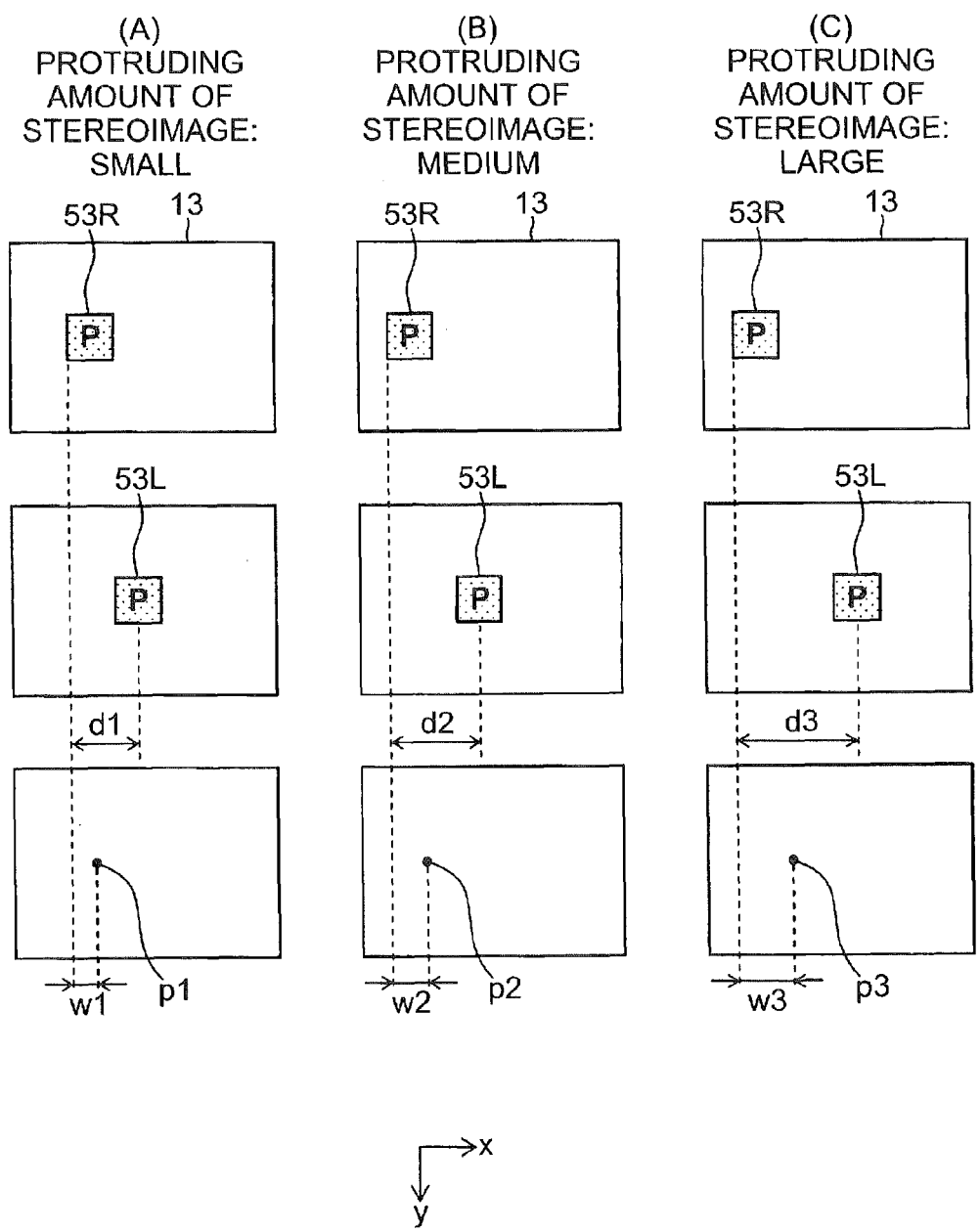
FIG. 8 is an illustration used for describing a dominant-eye measurement processing according to the third embodiment.

For example, a 3D pointing image which includes the right-eye pointing image 53R and the left-eye pointing image 53L is displayed on the three-dimensional display unit 13 with three different stereoscopic effects as shown in FIG. 8(A) to FIG. 8(C). In this embodiment, the 3D pointing image is displayed with three different stereoscopic effects (protrusion amount of the stereoimage); i.e. small, medium and large. That is, the stereoscopic effect setting unit 14 changes the stereoscopic effect of the 3D pointing image by changing the parallax amount as d1, d2 and d3 to allow the user to perform pointing operation on the respective 3D pointing image. The pointing position detection unit 16 detects the pointing positions p1, p2 and p3 each corresponding to the parallax amounts d1, d2 and d3 as the coordinate values on the display surface of the three-dimensional display unit 13.

According to this embodiment, w=a×d is used as the formula of the dominant-eye model. Here, w is a distance from a reference position of one pointing image (in this embodiment, the center position of the right-eye pointing image 53R) to the pointing position; a is a dominant-eye parameter; and d is the parallax amount. That is, the dominant-eye measurement unit 21 calculates a value a=w/d, which represents that the pointing position is closer to the reference position of which pointing images (displaced), as the dominant-eye parameter, with reference to the reference position (center position) of the right-eye pointing image 53R the reference position (center position) of the left-eye pointing image 53L.

For example, when the user has the dominant-eye at the right side, the dominant-eye parameter a is less than 0.5. That is, the pointing position is located at a position closer to the center position of the right-eye pointing image 53R. When the user has the dominant-eye at the left side, the dominant-eye parameter a is larger than 0.5. That is, the pointing position is located at a position closer to the center position of the left-eye pointing image 53L. When the dominant-eye parameter a is 0.5, there is a high possibility that the user has the dominant-eyes at the both sides. However, this case may be handled as the dominant-eye at the right side or the dominant-eye at the left side for convenience sake.

According to this embodiment, there are three sets of the parallax amount d and the distance w; i.e. (d1, w1), (d2, w2) and (d3, w3). The dominant-eye parameter a may be calculated by using a single set. However, to increase the accuracy, the dominant-eye parameter a is calculated by using the three sets of the parallax amount by the method of least squares. Square error J is defined as shown below.

$$J=\Sigma(wi-a\times di)^2 \ldots (i=1, 2, 3) \quad \text{[Formula 3]}$$

After performing a partial differentiation on the square error J with a to be calculated, giving zero (0) to the obtained formula, and calculation of the same may be made to obtain the value of a.

$$\partial J/\partial a = -2\times\Sigma[di\times(wi-a\times di)]=0 \quad \text{[Formula 4]}$$

$$a=\Sigma(di\times wi)/\Sigma(di\times di) \quad \text{[Formula 5]}$$

With this, not only the dominant-eye of the user but the level of the dominant-eye also are obtained (the smaller a, the stronger level of the dominant-eye at the right side). This model is intended just as an example, other model may be used.

Figure 9:
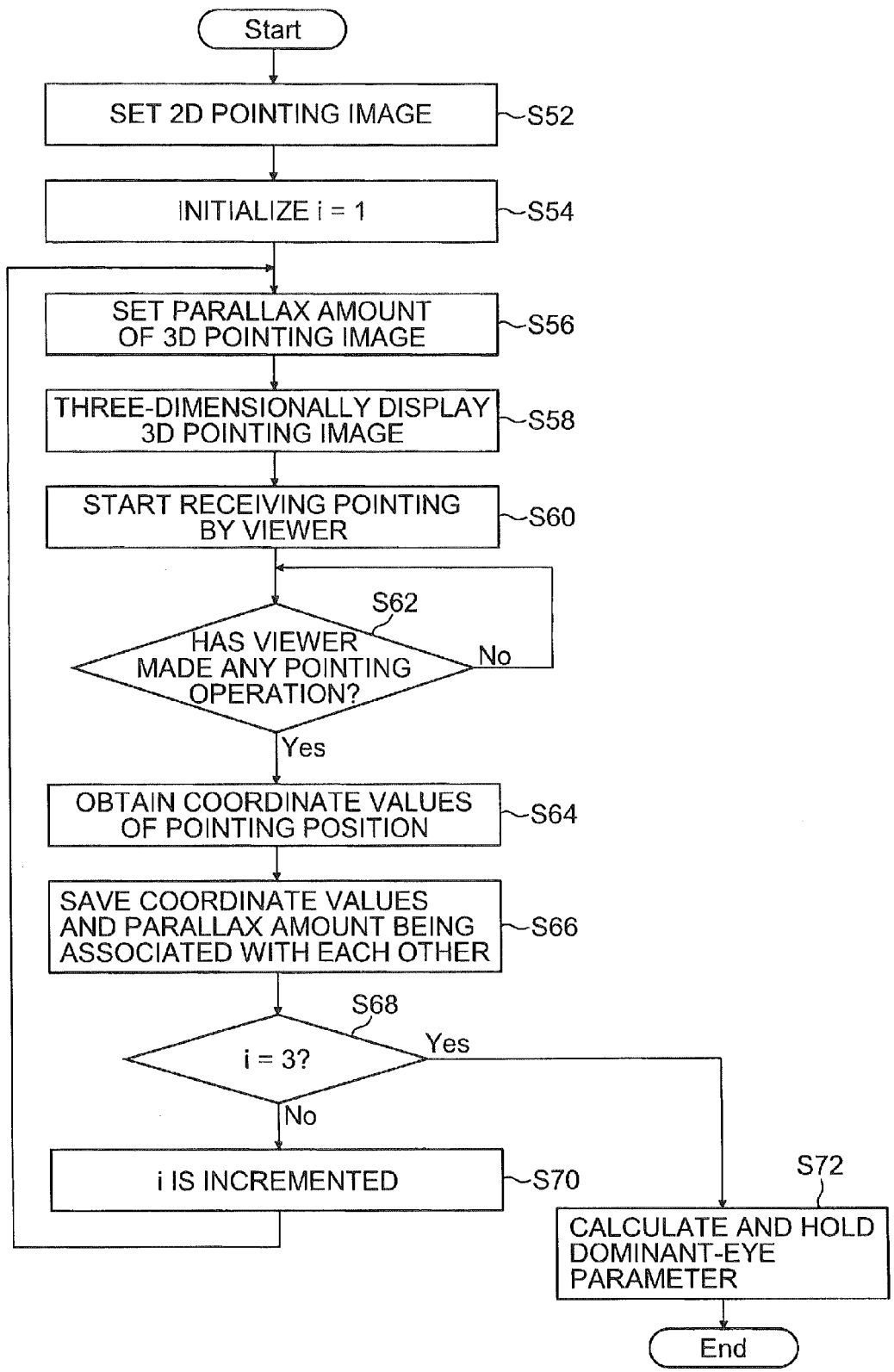
FIG. 9 is a flowchart showing an example of a flow of the dominant-eye measurement processing according to the third embodiment.

FIG. 9 is a flowchart showing an example of a flow of the dominant-eye measurement processing according to the third embodiment. The control unit 20 executes the processing in accordance with a program.

In step S52, a 2D pointing image is set; in step S54, index i is initialized (i=1); in step S56, the parallax amount of the 3D pointing image is set to di; in step S58, the 3D pointing image is three-dimensionally displayed: and in step S60, reception of viewer's pointing is started. That is, the image inputting unit 11 provides a 2D pointing image to the three-dimensional image processing unit 12; and the stereoscopic effect setting unit 14 provides the parallax amount di to the three-dimensional image processing unit 12, thereby the three-dimensional image processing unit 12 generates a 3D pointing image having the parallax amount di. Thus, the 3D pointing image is displayed on the display surface of the three-dimensional display unit 13. The viewer performs a pointing operation on the display surface of the three-dimensional display unit 13 with a finger or the like while viewing the 3D pointing image displayed on the three-dimensional display unit 13.

In step S62, it is determined whether the viewer has made any pointing operation. When yes, coordinate values of the pointing position are obtained in step S64; and in step S66, the coordinate values of the pointing position and the parallax amount di are held being associated with each other. That is, the pointing position detection unit 16 detects viewer's pointing position on the display surface of the three-dimensional display unit 13, the dominant-eye measurement unit 21 stores the pointing position pi and the parallax amount di in the storage 15 while associating the same with each other.

In step S68, it is determined whether the index i has reached a prescribed number of times (in this embodiment: 3 times). When no, the index i is incremented in step S70 and steps S56 to S66 are repeated.

After executing steps S56 to S66 prescribed number of times, the dominant-eye parameter a is calculated and held in step S72. That is, the dominant-eye measurement unit 21 reads the pointing position pi from the storage 15 and calculates the distance wi between the reference position (center position) of the right-eye pointing image and the pointing position. Based on the wi and the parallax amount di, the dominant-eye parameter a is calculated. The a is held (stored) in the storage 15. The dominant-eye parameter a according to this embodiment represents both of the dominant-eye and the level of the dominant-eye of the viewer.

The dominant-eye parameter a varies depending on the viewer (user). Therefore, the dominant-eye parameter a is preferably stored in the storage 15 while being associated with a user ID (for example, name) and the pointing position detection area determination unit 18 preferably determines the range (position and size) of the pointing position detection area for each user.

To increase the measurement accuracy of the dominant-eye measurement by the dominant-eye measurement unit 21, the following measurement modes are available.

First, there is a mode in which the 3D pointing image is displayed several times on the three-dimensional display unit 13 while varying the parallax amount, the pointing position detection unit 16 detects the user's pointing position several times, and then the dominant-eye information is calculated.

Secondly, there is a mode in which the 3D pointing image is displayed several times on the three-dimensional display unit 13 while varying the display position, the pointing position detection unit 16 detects the user's pointing position several times, and then the dominant-eye info nation is calculated. The parallax amount is more preferably varied every time the 3D pointing image is displayed.

Thirdly, there is a mode in which several 3D pointing images are displayed simultaneously on the three-dimensional display unit 13 while varying the display position, the pointing position detection unit 16 detects the user's pointing position several times, and the dominant-eye information is calculated. The parallax amount is more preferably varied for each 3D pointing image.

The three-dimensional display device 10c according to this embodiment measures the dominant-eye of the user and the level of the dominant-eye and determines an pointing position detection area based on the measured result, the user's pointing is accordingly determined more appropriately.

Fourth Embodiment

Figure 10:
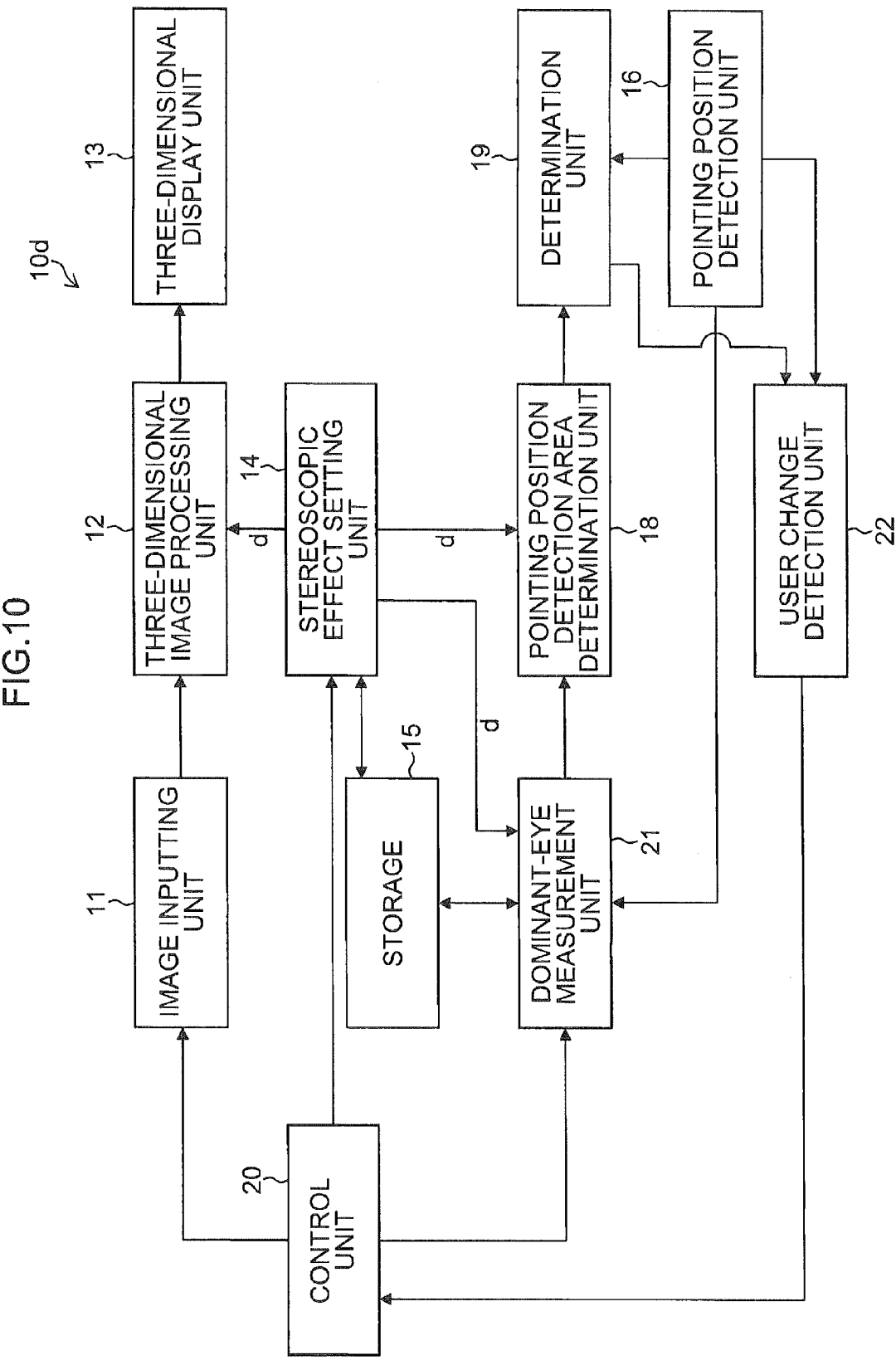
FIG. 10 is a block diagram showing an example of a configuration of a three-dimensional display device according to a fourth embodiment.

Then, a description is made on a fourth embodiment. FIG. 10 is a block diagram showing an example of a configuration of a three-dimensional display device 10d according to the fourth embodiment. The elements which are the same as those in the first embodiment shown in FIG. 1 and the third embodiment shown in FIG. 7 are given with the same reference numerals and characters; and as for the items which have been described, the description thereof is omitted here.

A user change detection unit 22 detects change of a user, who has input pointing through the pointing position detection unit 16. According to this embodiment, a change of the user is detected by detecting a change of the tendency of the touch operation (pointing position input) detected by the touch sensor configured in the pointing position detection unit 16. The user change detection unit 22 is configured by, for example, a microprocessor. The user change detection unit 22 detects, for example, in any of the following detection modes 1 and 2.

Detection mode 1: a piece of history information on the pointing position detected by the pointing position detection unit 16 is created, the change of the user is detected by detecting a change of at least one of the dominant-eye and the level of the dominant-eye based on the history information on the pointing position. In particular, a change in the dominant-eye or the strength level of the dominant-eye is detected due to a change in a difference of the pointing position detected by the pointing position detection unit 16 based on the display position of the left-eye pointing image and the right-eye pointing image (or position of the pointing position detection area).

Detection mode 2: the number of times (number of miss hits) or frequency that pointing position (touch position) detected by the pointing position detection unit 16 is out of the range of the pointing position detection area (reaction area) determined by the pointing position detection area determination unit 18 is calculated, and a change of the user is detected based on the calculation result. As the number of times or frequency, for example, the number of times of continuous miss hits (number of continuous miss hits) or the ratio of the number of miss hits (miss hit ratio) with reference to a predetermined touch number may be used.

The control unit 20 according to this embodiment executes at least one processing of the following processing 1 to 4 when a change of the user has been detected.

Processing 1 (calibration processing): a piece of information on the dominant-eye of a new user is obtained, at least one difference in the position, the size and the shape of the pointing position detection area is determined based on the display area of the left-eye pointing image and the right-eye pointing image.

Processing 2 (detection mode switching processing): the mode is switched from a first detection mode, in which the pointing position detection area is determined based on the dominant-eye information, to a second detection mode, in which the pointing position detection area is set to default which has a size larger than that at the time of the first detection mode. In the first detection mode, a relative narrow pointing position detection area is set based on the dominant-eye information as described in the first embodiment; and in the second detection mode, a pointing position detection area wider than that at the time of the first detection mode is set as described in the second embodiment.

Processing 3 (display mode switching processing): the mode is switched from a display mode in which a 3D pointing image is displayed to a display mode in which a 2D pointing image is displayed.

Processing 4 (alarm processing): an alarm is output.

The above processing 1 to 4 may be executed being combined with each other. For example, after executing alarm processing to display an alarm that the mode is switched to the two-dimensional display mode, the above described display mode switching processing is executed, and then a switch to the display of a 2D pointing image is made.

When a change of the user has been detected, a selection of the processing to be executed may be received from the user. For example, a user selection screen is displayed on the three-dimensional display unit 13 to allow the user to select the processing 2 or the processing 3, and user's selection operation is received through the pointing position detection unit 16. On the user selection screen, the pointing image may be two-dimensionally displayed.

Figure 11:
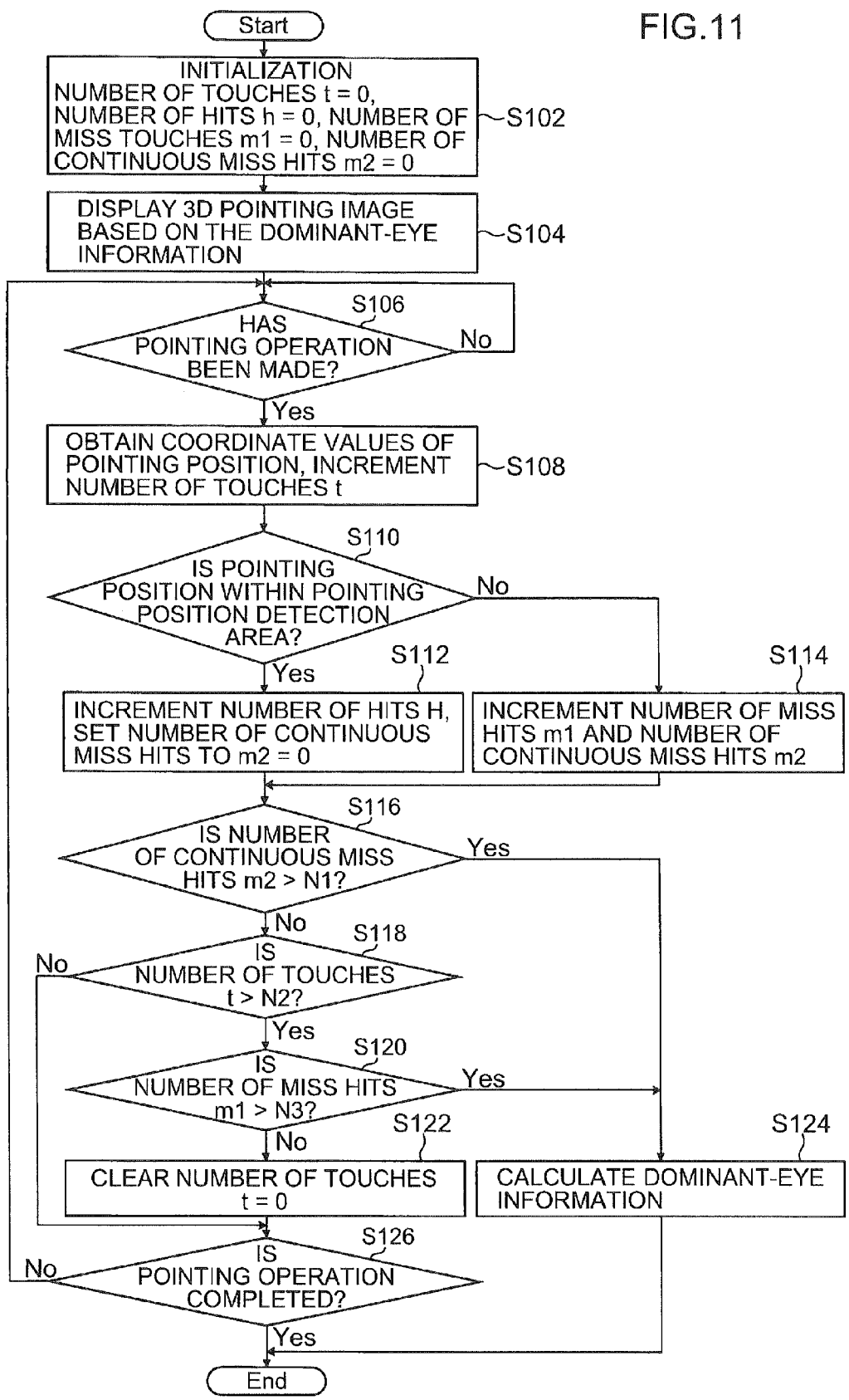
FIG. 11 is a flowchart showing an example of a flow of user change detection according to the fourth embodiment.

FIG. 11 is a flowchart showing an example of a flow of the user change detection processing according to the fourth embodiment. The processing is executed in accordance with a program by the control unit 20 and the user change detection unit 22.

In step S102, the respective variables are initialized. That is, the number of touches t which represents the number of times of touches; the number of hits h which represents the number of times of touches within the pointing position detection area (referred to as "hit"); the number of miss touches m1 which represents the number of times of touches out of the pointing position detection area (referred to as "miss hit"); and number of continuous miss hits m2 which represents the continuous times of miss hits are reset to zero (t=h=m1=m2=0).

In step S104, the 3D pointing image is displayed on the three-dimensional display unit 13 based on the dominant-eye information.

In step S106, it is determined whether any pointing operation has been made. That is, it is determined whether any touch has been detected by the touch sensor configured in the pointing position detection unit 16. When any touch operation has been detected, the processing proceeds to step S108.

In step S108, the coordinate values of the pointing position are obtained from the pointing position detection unit 16, and the number of touches t is incremented (t=t+1).

In step S110, it is determined whether the pointing position is within the pointing position detection area determined by the pointing position detection area determination unit 18.

When it is determined as within the pointing position detection area, in step S112, the number of hits h is incremented (h=h+1), and the number of continuous miss hits m2 is set to zero (m2=0).

When it is determined as out of the pointing position detection area, in step S114, the number of miss hits m1 and number of continuous miss hits m2 are incremented (m1=m1+1, m2=m2+1).

In step S116, it is determined if the number of continuous miss hits m2>threshold value N1 (for example, N1=2). If m2>N1, the process proceeds to step S124.

In step S118, it is determined if the number of touches t>threshold value N2 (for example, N2=4). If t>N2, it is further determined if the number of miss hits m1>N3 (for example, N3=2) in step S120. If m1>N3, the processing proceeds to step S124; and if m1≤N3, the number of touches t is cleared (t=0), and the processing proceeds to step S126.

In step S124, the dominant-eye measurement unit 21 calculates the dominant-eye information and calibration processing is made.

In step S126, it is determined whether the pointing operation has completed; if not completed, the processing returns to step S106, if completed, the processing is terminated.

In the first embodiment to fourth embodiment, examples in which both the position and the size of the pointing position detection area are determined in accordance with the information on the dominant-eye of the user have been described. However, either one of the position and the size may be determined in accordance with the dominant-eye of the user. Also, in the above description, an example, in which the shape of the pointing position detection area is a rectangular shape, is given. However, the shape of the pointing position detection area is not particularly limited. For example, the pointing position detection area may be an elliptical shape.

The shape of the pointing position detection area may be determined based on the dominant-eye of the user.

Figure 12:
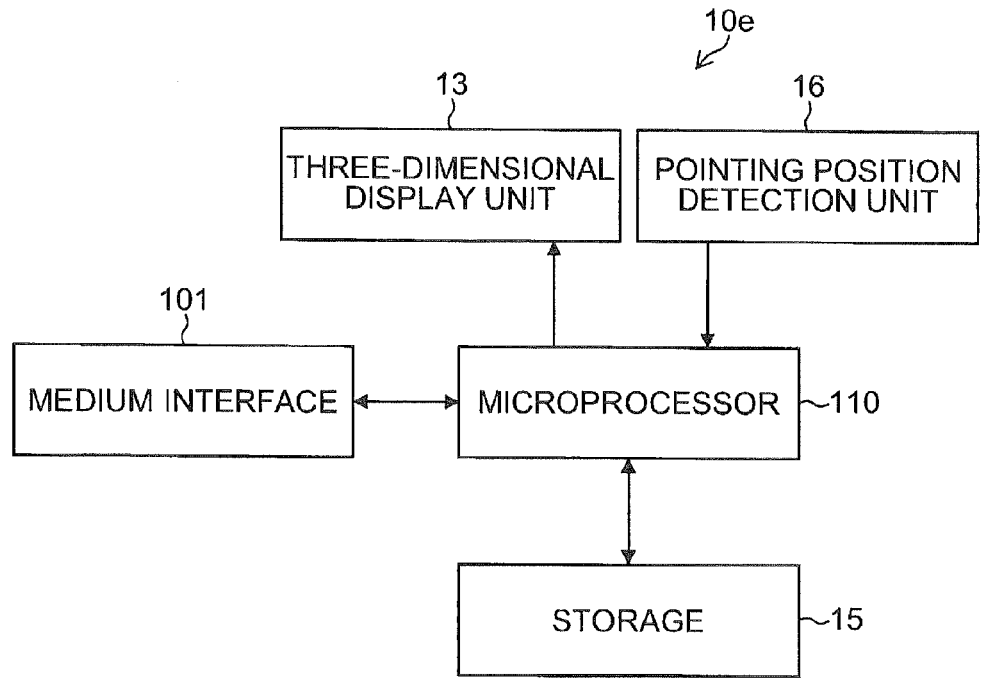
FIG. 12 is a block diagram showing an example of a basic configuration of hardware of the three-dimensional display device according to the present invention.

FIG. 12 is a block diagram illustrating a basic configuration of hardware to which the three-dimensional display device according to the above-described first embodiment to the fourth embodiment is applied. In the three-dimensional display device 10e shown in FIG. 12, the image inputting unit 11, the three-dimensional image processing unit 12, the pointing position detection area determination unit 18, the determination unit 19, the control unit 20, the dominant-eye measurement unit 21, and the user change detection unit 22 according to the first embodiment to the fourth embodiment are configured by a microprocessor 110. A medium interface 101 performs data read and data write on a medium detachable to the main body of the three-dimensional display device 10e, such as memory card. As the medium interface 101, a network interface performing communication via a network may be used.

As the three-dimensional display device 10e as described above, various digital devices capable of three-dimensional display, for example, a personal computer, a 3D TV set, a 3D game machine, a 3D mobile terminal are available.

Figure 13:
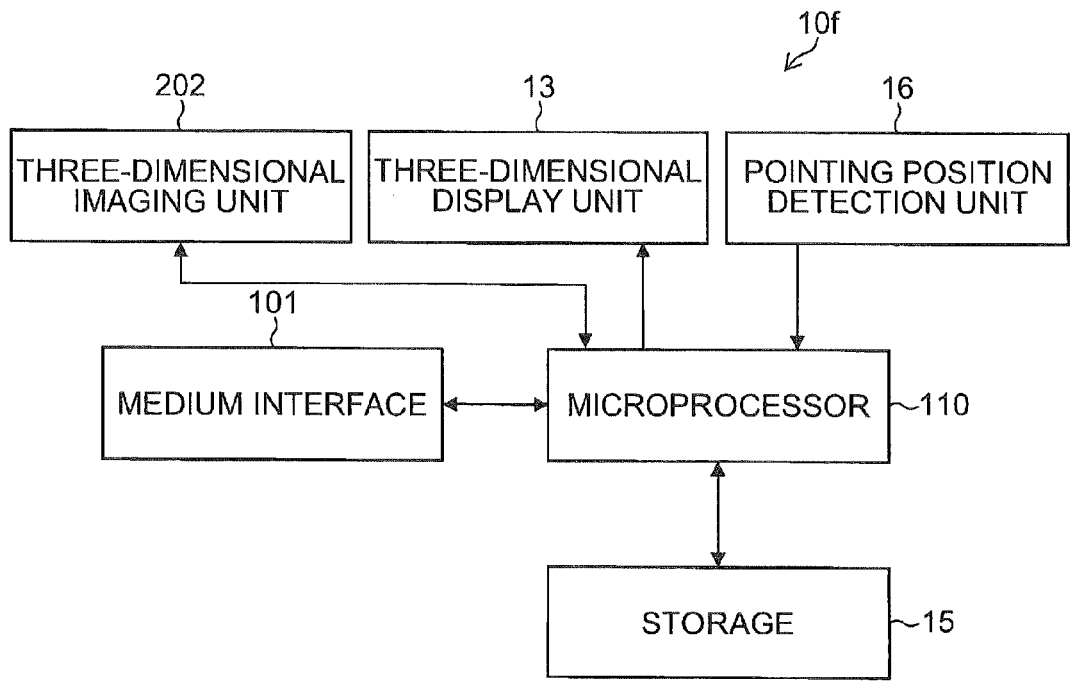
FIG. 13 is a block diagram showing an example of a three-dimensional image capturing device to which the three-dimensional display device according to the present invention is applied.
Figure 14:
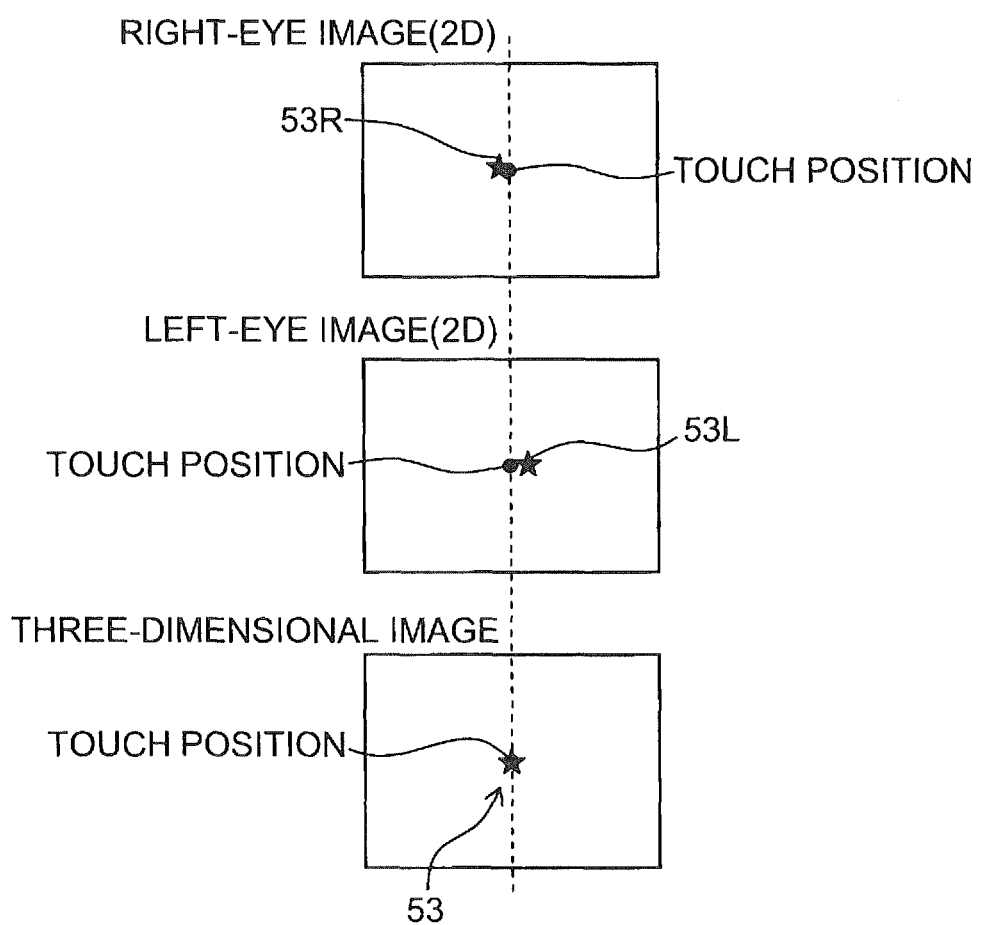
FIG. 14 is an illustration used for describing the problem of the present invention.

FIG. 13 is a block diagram illustrating an example of a three-dimensional display device 10f (a 3D camera) to which the three-dimensional display device according to the present invention is applied. The elements shown in the three-dimensional display device 10e in FIG. 12 are given with the same reference numerals. The three-dimensional display device 10f shown in FIG. 13 includes a three-dimensional imaging unit 202 which obtains a three-dimensional image including a right-eye image and a left-eye image by taking an image of an object from multiple view points. In the three-dimensional display device 10f according to this embodiment includes, same as the three-dimensional display device 10e shown in FIG. 12, the image inputting unit 11, the three-dimensional image processing unit 12, the pointing position detection area determination unit 18, the determination unit 19, the control unit 20, the dominant-eye measurement unit 21, the user change detection unit 22 and the like are configured by the microprocessor 110. In the three-dimensional display device 10f as described above, a three-dimensional pointing image for receiving user's pointing can be synthesized with respect to a three-dimensional image obtained by a three-dimensional imaging unit 202 and three-dimensionally displayed.

Each of various modes of the present invention has been described above, needless to say that the present invention may be implemented by combining the items which have been described in this description as many as possible.

A program for causing a computer to execute various methods described in this description may be recorded in a predetermined recording medium such as a disk, memory card and the like and be provided for application thereof.

The present invention is not limited to the embodiments described in this description or the examples illustrated in the figures. Needless to say that various design changes and modifications may be made within a range of spirit of the present invention.

REFERENCE SIGNS LIST 10 (10a, 10b, 10c, 10d, 10e, 10f) . . . three-dimensional display device, 11 . . . image inputting unit, 12 . . . three-dimensional image processing unit, 13 . . . three-dimensional display unit, 14 . . . stereoscopic effect setting unit, 15 . . . storage, 16 . . . pointing position detection unit, 17 . . . dominant-eye information setting unit (dominant-eye information obtaining unit), 18 . . . pointing position detection area determination unit, 19 . . . determination unit, 20 . . . control unit, 21 . . . dominant-eye measurement unit, 22 . . . user change detection unit, 53R . . . right-eye pointing image, 53L . . . left-eye pointing image, 56 . . . pointing position detection area

The invention claimed is:
1. A three-dimensional display device, comprising:
a three-dimensional display unit that displays a three-dimensional pointing image for receiving a user's pointing, the three-dimensional pointing image including a right-eye pointing image and a left-eye pointing image;

a pointing position detection unit that detects the user's pointing position on a display surface of the three-dimensional display unit;

a dominant-eye information obtaining unit that obtains a piece of dominant-eye information representing a dominant-eye of the user;

a detection area determination unit that determines a detection area of the pointing position on the display surface of the three-dimensional display unit based on at least the dominant-eye information; and a determination unit that determines whether the pointing position detected by the pointing position detection unit is within the detection area to thereby receive the user's pointing corresponding to the three-dimensional pointing image, wherein the detection area determination unit determines the detection area in accordance with a parallax amount of the three-dimensional pointing image such that a size of the detection area is set larger as the parallax amount becomes larger.

2. The three-dimensional display device according to claim 1, wherein the detection area determination unit changes at least one of the position, the size and the shape of the detection area in accordance with the existence or absence of the dominant-eye information.

3. The three-dimensional display device according to claim 2, wherein, when the dominant-eye information exists, the detection area determination unit causes the size of the detection area to be smaller than the size of the detection area in the case of the absence of the dominant-eye information.

4. The three-dimensional display device according to claim 1, wherein, when the dominant-eye information exists, the detection area determination unit changes at least one of the position, the size and the shape of the detection area depending on the user's dominant-eye at the right side or left side.

5. The three-dimensional display device according to claim 4, wherein, when the dominant-eye information exists, the detection area determination unit disposes the detection area closer to a display position of a pointing image of the dominant-eye in the right-eye pointing image and the left-eye pointing image.

6. The three-dimensional display device according to claim 1, wherein, when the dominant-eye information exists, the detection area determination unit determines the detection area so that at least a part of the pointing image corresponding to the dominant-eye in the right-eye pointing image and the left-eye pointing image is included.

7. The three-dimensional display device according to claim 1, wherein, when the dominant-eye information is absent, the detection area determination unit determines the detection area so that at least a part of the right-eye pointing image and at least a part of the left-eye pointing image are included.

8. The three-dimensional display device according to claim 1, wherein the dominant-eye information obtaining unit receives an input operation of the information on the dominant-eye of the user.

9. The three-dimensional display device according to claim 1, comprising:

a stereoscopic effect setting unit that receives a setting input operation of the magnitude of a stereoscopic effect of the three-dimensional pointing image; and a three-dimensional pointing image generation unit that generates the three-dimensional pointing image with the parallax amount corresponding to the magnitude of the set and input stereoscopic effect, wherein the three-dimensional display unit displays a three-dimensional display image generated by the three-dimensional pointing image generation unit, and the detection area determination unit determines the detection area based on the parallax amount corresponding to the magnitude of the stereoscopic effect.

10. The three-dimensional display device according to claim 1, further including a user change detection unit that detects a change of the user who has input the pointing through the pointing position detection unit.

11. The three-dimensional display device according to claim 10, wherein the user change detection unit calculates the number of times or frequency when the pointing position detected by the pointing position detection unit is out of the range of a detection area determined by the detection area determination unit to detect a change of the user based on the calculation result.

12. The three-dimensional display device according to claim 10, wherein the user change detection unit creates a piece of history information on the pointing position detected by the pointing position detection unit and detects a change of the user based on the history information on the pointing position.

13. The three-dimensional display device according to claim 12, wherein the user change detection unit detects a change of the user by detecting a change of the dominant-eye or the strength level of the dominant-eye based on the history information on the pointing position.

14. The three-dimensional display device according to claim 10, further comprising a control unit that executes at least any one of:

calibration processing in which, when a change of the user has been detected by the user change detection unit, the dominant-eye information of a new user is obtained and at least one difference in the position, the size and the shape of the detection area with respect to the display area of the left-eye pointing image and the right-eye pointing image is determined;

detection mode switching processing to switch the mode from a first detection mode in which the detection area is determined based on the dominant-eye information to a second detection mode in which the detection area is set to a default having a larger size than the default at the time of the first detection mode;

display mode switching processing to switch the mode from a first display mode in which the three-dimensional pointing image is displayed, to a second display mode in which a plane pointing image is displayed; and alarm processing to output an alarm.

15. The three-dimensional display device according to claim 10, further comprising a selection reception unit that, when a change of the user has been detected, receives from the user a selection of a process to be executed.

16. A three-dimensional image capturing device, comprising:

the three-dimensional display device set forth in claim 1; and a three-dimensional imaging unit that obtains a three-dimensional image by taking an image of an object from multiple view points, wherein the three-dimensional image capturing device synthesizes the three-dimensional image and the three-dimensional pointing image with each other to three-dimensionally display the synthesized image by the three-dimensional display unit.

17. A three-dimensional display device, comprising:
a three-dimensional display unit that displays a three-dimensional pointing image for receiving a user's pointing, the three-dimensional pointing image including a right-eye pointing image and a left-eye pointing image;
a pointing position detection unit that detects the user's pointing position on a display surface of the three-dimensional display unit;
a dominant-eye information obtaining unit that obtains a piece of dominant-eye information representing a dominant-eye of the user;
a detection area determination unit that determines a detection area of the pointing position on the display surface of the three-dimensional display unit based on at least the dominant-eye information; and
a determination unit that determines whether the pointing position detected by the pointing position detection unit is within the detection area to thereby receive the user's pointing corresponding to the three-dimensional pointing image, wherein
the dominant-eye information obtaining unit calculates the dominant-eye information which represents the dominant-eye of the user and a strength level of the dominant-eye based on the user's pointing position detected by the pointing position detection unit in a state that the three-dimensional pointing image is displayed on the three-dimensional display unit and a parallax amount of the three-dimensional pointing image, and
the detection area determination unit determines the detection area according to the calculated dominant-eye of the user and the strength level of the dominant-eye.

18. The three-dimensional display device according to claim 17, wherein the dominant-eye information is calculated by displaying the three-dimensional pointing image several times on the three-dimensional display unit while varying the parallax amount to detect the user's pointing position several times with the pointing position detection unit.

19. The three-dimensional display device according to claim 17, wherein the dominant-eye information is calculated by displaying the three-dimensional pointing image several times on the three-dimensional display unit while varying the display position to detect the user's pointing position several times with the pointing position detection unit.

20. The three-dimensional display device according to claim 17, wherein the dominant-eye information is calculated by displaying several three-dimensional pointing images on the three-dimensional display unit while varying the display position to detect the user's pointing position several times with the pointing position detection unit.

21. A pointing determination method using a three-dimensional display unit that displays a three-dimensional pointing image for receiving a user's pointing, the three-dimensional pointing image including a right-eye pointing image and a left-eye pointing image; a pointing position detection unit that detects the user's pointing position on a display surface of the three-dimensional display unit; and a dominant-eye information obtaining unit that obtains a piece of dominant-eye information representing a dominant-eye of the user,
the pointing determination method comprising:
a detection area determination step to determine a detection area of the pointing position on the display surface of the three-dimensional display unit based on the dominant-eye information obtained by the dominant-eye information obtaining unit;
a pointing position detection step to detect the user's pointing position on the surface of the three-dimensional display unit with the pointing position detection unit; and
a determination step to determine whether the pointing position detected by the pointing position detection unit is within the detection area, wherein,
in the detection area determination step, the detection area is determined in accordance with a parallax amount of the three-dimensional pointing image such that a size of the detection area is set larger as the parallax amount becomes larger.

22. The pointing determination method according to claim 21, performing at least any one of:
calibration processing in which a change of the user who has input the pointing through the pointing position detection unit is detected, and, when a change of the user has been detected, the dominant-eye information of a new user is obtained and at least one difference in the position, the size and the shape of the detection area with respect to a display area of the left-eye pointing image and the right-eye pointing image is determined;
detection mode switching processing to switch the mode from a first detection mode in which the detection area is determined based on the dominant-eye information to a second detection mode in which the detection area is set to a default having a larger size than the default at the time of the first detection mode;
display mode switching processing to switch the mode from a first display mode in which the three-dimensional pointing image is displayed, to a second display mode in which a plane pointing image is displayed; and
alarm processing to output an alarm.

23. A programmable non-transitory recording medium tangibly storing a pointing program which is executable by a digital processing device and readable by a machine to execute the pointing determination method set forth in claim 21.

24. A pointing determination method using a three-dimensional display unit that displays a three-dimensional pointing image for receiving a user's pointing, the three-dimensional pointing image including a right-eye pointing image and a left-eye pointing image; a pointing position detection unit that detects the user's pointing position on a display surface of the three-dimensional display unit; and a dominant-eye information obtaining unit that obtains a piece of dominant-eye information representing a dominant-eye of the user,
the pointing determination method comprising:
a detection area determination step to determine a detection area of the pointing position on the display surface of the three-dimensional display unit based on the dominant-eye information obtained by the dominant-eye information obtaining unit;
a pointing position detection step to detect the user's pointing position on the surface of the three-dimensional display unit with the pointing position detection unit;
a determination step to determine whether the pointing position detected by the pointing position detection unit is within the detection area; and
a step to calculate the dominant-eye information representing the dominant-eye of the user and a strength level of the dominant-eye based on the user's pointing position which has been detected by the pointing position detection unit in a state that the three-dimensional pointing image is displayed on the three-dimensional display unit and based on a parallax amount of the three-dimensional pointing image, wherein, in the detection area determination step, the detection area is determined according to the calculated dominant-eye of the user and the strength level of the dominant-eye.

25. The pointing determination method according to claim 24, further comprising a step to receive an input operation of the dominant-eye information of the user.

* * * * *